(12) United States Patent
Jesse et al.

(10) Patent No.: US 8,484,759 B2
(45) Date of Patent: Jul. 9, 2013

(54) SPATIALLY RESOLVED QUANTITATIVE MAPPING OF THERMOMECHANICAL PROPERTIES AND PHASE TRANSITION TEMPERATURES USING SCANNING PROBE MICROSCOPY

(75) Inventors: Stephen Jesse, Knoxville, TN (US);
Sergei V. Kalinin, Knoxville, TN (US);
Maxim P. Nikiforov, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 291 days.

(21) Appl. No.: 12/857,894

(22) Filed: Aug. 17, 2010

(65) Prior Publication Data
US 2011/0041223 A1 Feb. 17, 2011

Related U.S. Application Data

(60) Provisional application No. 61/234,414, filed on Aug. 17, 2009.

(51) Int. Cl.
*G01Q 60/58* (2010.01)
(52) U.S. Cl.
USPC .......... 850/50; 850/1; 850/8; 850/11; 850/12; 850/21; 850/33; 850/54; 850/61; 374/31; 374/45; 374/46; 374/100; 374/117

(58) Field of Classification Search
USPC .............. 850/1, 8, 11, 12, 13, 21, 33, 54, 61, 850/50; 374/31, 45, 46, 100, 117
See application file for complete search history.

(56) References Cited

U.S. PATENT DOCUMENTS 6,095,679 A * 8/2000 Hammiche et al. ............. 374/43
2007/0263696 A1* 11/2007 Kjoller et al. ................... 374/31

* cited by examiner

*Primary Examiner* — Nicole Ippolito
(74) *Attorney, Agent, or Firm* — Brinks Hofer Gilson & Lione

(57) ABSTRACT

An approach for the thermomechanical characterization of phase transitions in polymeric materials (polyethylene-terephthalate) by band excitation acoustic force microscopy is developed. This methodology allows the independent measurement of resonance frequency, Q factor, and oscillation amplitude of a tip-surface contact area as a function of tip temperature, from which the thermal evolution of tip-surface spring constant and mechanical dissipation can be extracted. A heating protocol maintained a constant tip-surface contact area and constant contact force, thereby allowing for reproducible measurements and quantitative extraction of material properties including temperature dependence of indentation-based elastic and loss moduli.

30 Claims, 15 Drawing Sheets

Tg

Topography

SPATIALLY RESOLVED QUANTITATIVE MAPPING OF THERMOMECHANICAL PROPERTIES AND PHASE TRANSITION TEMPERATURES USING SCANNING PROBE MICROSCOPY

CROSS-REFERENCES TO RELATED APPLICATIONS

The present application claims the benefit under 35 USC 119(e) of U.S. Provisional Application No. 61/234,414, filed on Aug. 17, 2009, the contents of which are incorporated herein by reference in its entirety.

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in the invention.

BACKGROUND

1. Technical Field

The present disclosure relates generally to measurement apparatuses and methods and, more particularly, to the quantitative mapping of thermomechanical properties using scanning probe microscopy.

2. Related Art

Knowledge of local thermomechanical properties of materials is invaluable for a broad spectrum of structural and functional materials including composites, coatings, pharmaceutical, and various drug applications that span a multibillion dollar market of polymer and organic materials. For example, in polymeric composites in which local phase transition temperatures vary between the constituent phases as well as at the interfaces of phases, local behavior of the polymeric composites may determine the overall thermal stability of polymeric coating, structural materials, and other structural and functional materials.

The methods for the analysis of the local thermomechanical behavior may be categorized into two groups. The first methodology utilizes uniform temperature fields when performing local mechanical testing. An example of such an approach is a variable temperature dynamic mechanical analysis (DMA). DMA enables temperature dependent measurements of mechanical properties to be taken of various materials. The analysis is performed within a chamber having controlled temperature and atmospheric conditions. However, this implementation results in a bulk of a sample material under test being heated thereby making it difficult to obtain accurate measurements of spatially resolved mechanical properties.

Alternatively, local heating methods enable a probe to locally confine a thermal field to a specified region of a sample and detect local mechanical properties. This local heating approach provides for improved spatial resolution of the measurements taken of the thermomechanical properties of the sample. Furthermore, by utilizing the local heating methodology, the thermal degradation of the bulk of the material is in large part avoided (e.g., the local heating method is substantially non-destructive).

Local thermal analysis (LTA) has emerged as a Scanning Probe Microscopy (SPM) based methodology that allows for melting and glass transition temperatures to be probed and measured at a 100 nanometer resolution. LTA has been employed in numerous applications in the fields of polymer science. Typical LTA may utilize various detection mechanisms to measure temperature dependent mechanical properties such as monitoring the displacement of a tip due to the penetration of a tip into a sample, the thermal expansion of the material under analysis, temperature dependent friction, and/or the change in thermal impedance. In some studies, active feedback is used in order for a heated probe to apply a constant pressure on a surface of a material. However, the detection mechanisms described above may be insensitive to changes in the dissipative properties that characterize the material sample (e.g., changes in the loss modulus) and therefore preclude a high-accuracy determination of the transition temperature of the material. A contact area between the probe and the material may vary due to changes in the effective material properties preventing an accurate quantitative interpretation of LTA mechanical and thermal dissipation data.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

Figure 1:
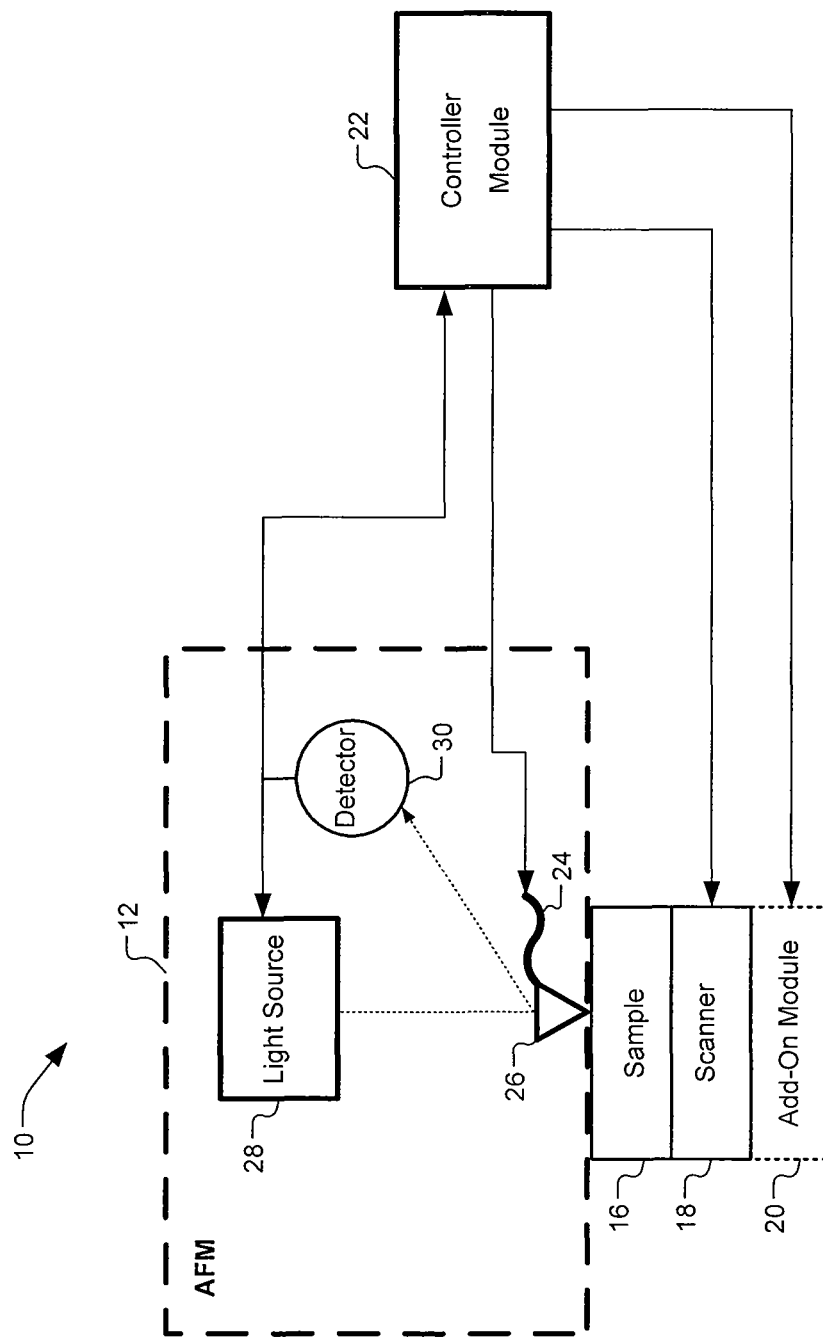
FIG. 1 is a functional block diagram of an exemplary atomic force microscopy (AFM) system.

Scanning probe microscopy (SPM) based techniques may provide high resolution imaging of various material properties. Substantial efforts have been made into the characterization of thermomechanical properties of polymeric materials at the nanoscale using SPM based techniques. However, the application of SPM techniques for probing temperature or field-induced transitions and the mechanical properties associated with those transitions has been limited by a lack of quantitativeness and a lack of sensitivity to dissipative properties.

The lack of quantitativeness may be due to the insufficient control provided by some SPM techniques of the fundamental contact mechanics of the probe tip-to-sample surface junction, that may be referred to as the tip-surface junction, in which measurable mechanical responses such as pull-off force or resonance frequency shift depend substantially on contact radius. As such, relatively small changes in material properties are often masked by substantially larger response variations arising from changes in contact geometry.

Current SPM techniques may lack the necessary sensitivity to dissipative properties. Some detection signal detection mechanisms employed in SPM techniques based on either the detection of static deflection or single-frequency lock-in methods tend may degrade the sensitivity to dissipative interactions. For example, the static deflection method lacks any appreciable sensitivity to dissipative interactions while single-frequency lock-in methods merely enable the measurement of two parameters, namely amplitude and phase, thereby rendering both methods inadequate for a complete characterization of a system under test.

The systems and methods described herein are related to various systems and methods that allow for the quantitative mapping of thermomechanical properties and local thermal phase transitions based on a combination of thermal field confinement and multi-frequency thermomechanical detection, and are exemplary in nature. More particularly, the systems and methods may allow for the quantitative measure of mechanical properties of polymeric materials based on "fixing" (e.g., making substantially constant) a contact region or area between a probe tip and a surface of a material under test ("tip-surface contact area") such that the mechanical behavior of the tip-surface contact area may be reproducible as a function of temperature. Furthermore, a frequency band excitation technique is described that enables probing of both the elastic and dissipative properties of the contact area and the capture thermomechanical properties at a micro-meter length with sub-100 nanometer (nm) spatial resolution which can then be utilized for the characterization of local, temperature induced transformations. The disclosure may be applied to many useful arts, including, but not limited to, the characterization of thermomechanical properties of the materials, the characterization of distribution of glass transition temperatures in the materials, and the quality control of pharmaceutical coatings.

In FIG. 1, an exemplary band excitation scanning probe microscopy (SPM) system 10 that implements a band excitation SPM technique (e.g., BE-AFAM or BE-SJThEM) is shown. The band excitation technique is based on a high fidelity characterization of thermomechanical properties of a tip-surface contact area. The band excitation technique enables measurements to be taken of the system's 10 response within a frequency band (e.g., not a single frequency), thereby providing a direct measure of all resonance parameters (e.g., amplitude, phase, quality factor, and/or resonance frequency). Changes detected in these resonance parameters that characterize the tip-surface contact area are each independently indicative of changes in properties (e.g., phase transitions) of the material under test as a function of temperature.

The system 10 comprises an atomic force microscopy (AFM) system, though other SPM implementations may be used. AFM is may be utilized to obtain high-resolution mechanical properties having nanometer or even sub-nanometer resolution. The AFM system 10 includes an AFM 12, a sample 16, a scanner 18, and an add-on module 20 shown in phantom. The AFM 12 may be a commercial product such as a MultiMode system made by Veeco equipped with a controller module 22 (e.g., a Nanonis controller) and a heated cantilever 24 from Anasys Instruments (e.g., ANS 200 having a spring constant of approximately 0.5 $Nm^{-1}$). The cantilever 24 is equipped with a probe tip 26, referred to simply as a tip 26. The AFM 12 further includes a light source 28 such as a laser diode that generates a beam of light that is directed towards the cantilever 24 and reflected toward a detector 30 such as a four-quadrant photodetector. The reflected beam contains information regarding the deflection undergone by the cantilever 24. The exemplary system 10 may include additional components such as additional circuitry, firmware and/or processing modules. Portions of the system 10 may be implemented by one or more integrated circuits (ICs) or chips. Furthermore, the controller module 22 and the add-on module 20 may respectively include one or more modules or components.

The band excitation atomic force acoustic microscopy (BE-AFAM) 10, is based on the combination of atomic force acoustic microscopy (AFAM) and band excitation that enables the unambiguous detection of changes in resonance frequency and tip-surface dissipation of a polymeric material under analysis using a heated tip probe (e.g., probe 26). The system 10 performs periodic mechanical oscillations of the sample 16 as an excitation technique of tip-surface contact resonance.

The relative image formation mechanism in BE-AFAM can be illustrated as described below. Assuming that the tip displacement (h) is a function of the material and contact parameters, such as contact pressure (P), temperature (T), contact radius ($R_0$), material Young's modulus (E(T)), material loss modulus ($\gamma(T)$):

$$h = h(P, T, R_0, E(T), \gamma(T)). \tag{1}$$

In BE-AFAM, the tip-induced thermal expansion, $$k_1 = (dh/dP)^{-1}, \tag{2}$$

is measured and can be obtained from an experimentally measured resonance frequency of a cantilever in contact with a surface of a sample where the cantilever possesses a known spring constant as is well established in an analysis of AFAM data.

In FIG. 1, the sample 16 is excited using periodic mechanical oscillations. In the present embodiment, the add-on module 20 includes a mechanical transducer (not shown) such as a piezoelectric oscillator. The sample 16 is bonded (e.g., glued to the surface) to the mechanical transducer 20 which is configured to oscillate the sample 16. The add-on module 20 (e.g., the mechanical transducer) is driven by a band excitation waveform generated by the controller module 22. In the present implementation, an excitation band of approximately 150-450 kilohertz (kHz) with about a 1 volt (V) amplitude generated by the control module 22 is utilized to drive the add-on module 20. Various other parameters of excitation bands used to drive the add-on module 20 are contemplated.

In FIG. 1, the sample 16 is positioned to be in mechanical contact with the tip 26. Mechanical contact between the tip 26 and a surface of the sample 16 facilities heat transfer from the tip to the surface of the sample 16 leading to a local thermal expansion of the material of the sample 16 under the tip 26. The temperature of the cantilever 24 is based on the voltage applied to the tip 26. Due to the difference in thermal impedance between the cantilever 24 and the tip 26, the temperature of the tip 26 may be different from the cantilever 24. As such, in present implementation, standard polymeric samples (e.g., polycaprolactone (PCL), high density polyethylene (HDPE), and polyethylene terephthalate (PET)) with known melting temperatures were utilized to calibrate a temperature at the tip 26 by a continuously changing voltage with at approximately 0.1 V/s rate until detection of a melting temperature of the sample 16. Several methods for temperature calibration of the tip 26 may utilized such as IR microscopy and Raman thermometry. In order to perform quantitative measurements, the tip 26 is heated and cooled over several cycles as described in more detail below.

The detector 30 operates to detect the vertical displacement of the tip 26 (e.g., movement of the tip 26 in the z-direction) due to the thermal expansion of the sample 16 based on the reflected beam as discussed above. The information contained within the reflected beam is transmitted to the controller module 22 and processed to determine a mechanical response of the system 10. The controller module 22 operates to record the response of the system 10 by storing information (e.g., vertical displacement) contained with the reflected beam, or signal, that are associated with the motion of the tip 26. The controller module 22 calculates the Fourier transform of the response thereby enabling a full response in a vicinity of the resonance pick to be extracted with approximately 10 milliseconds (e.g., at the standard imaging rate). The controller module 22 utilizes a harmonic oscillator model to fit the resonance curves to extract resonance parameters (e.g., amplitude, resonance frequency, and quality factor) from the measured response. The resonant frequency is determined by the contact stiffness of the tip-surface contact area and is a good measure of Young's Modulus. The quality factor is proportional to the loss modulus allowing one to monitor the phase transition. The response amplitude is a direct measure of the thermal expansion coefficient. Note that the detection mechanism in BE allows for the unambiguous and cross-talk free differential of these signals.

A position of the tip 26 with respect to the sample 16 may be changed in the x-y direction. Based on the AFM implementation, the cantilever 24 or the sample 16 may be moved in the x-y direction. In the present implementation, the scanner 18 moves the sample 16 underneath the tip 26 causing the sample 16 to be first traversed in the x-direction and subsequently moved in the y-direction prior to the next x-direction translation.

In an alternative system, a BE-SJThEM or BE-LTA tip, 10 performs periodic heating of the tip 26 as an excitation technique of tip-surface contact resonance. In BE-SJThEM, the tip displacement (h) may be a function of the material and contact parameters, such as contact pressure (P), temperature (T), contact radius ($R_0$), material Young's modulus (E(T)), material loss modulus ($\gamma(T)$):

$$h = h(P, T, R_0, E(T), \gamma(T)). \tag{1}$$

In BE-SJThEM, the tip-induced thermal expansion, $$TR = dh/dT, \tag{3}$$

may be measured, where TR is the thermal response to a periodically modulated temperature of the tip 26.

In FIG. 1, the set-up of the BE-SJThEM technique is substantially similar to the set-up of the BE-AFAM technique. However, as noted above, the tip 26 is periodically heated based on a composite signal (e.g., the sum) of AC and DC heating controlled by the controller module 22. Specifically, a temperature of the tip 26 may be changed by applying a voltage to legs (not shown) of the cantilever 24 resulting in Joule heating of the tip 26. To probe the mechanical properties of the tip-surface contact area, the temperature at an end of the tip 26 in changed in periodic fashion. The electrical waveform generated by the controller module 22 for AC-heating of the tip 26 is a constant amplitude waveform (e.g., about 0.2 V) which contains all frequencies from the frequency band of interest (e.g., 150-450 kHz) centered at the constant resonance of the tip-sample contact area. To probe the temperature dependence of contact resonance properties, DC voltages were re-calculated from temperature-voltage calibration of the tip 26 and added to the AC-heating waveform to generate the heating waveform (e.g., the composite signal applied to the tip 26).

Figure 2A:
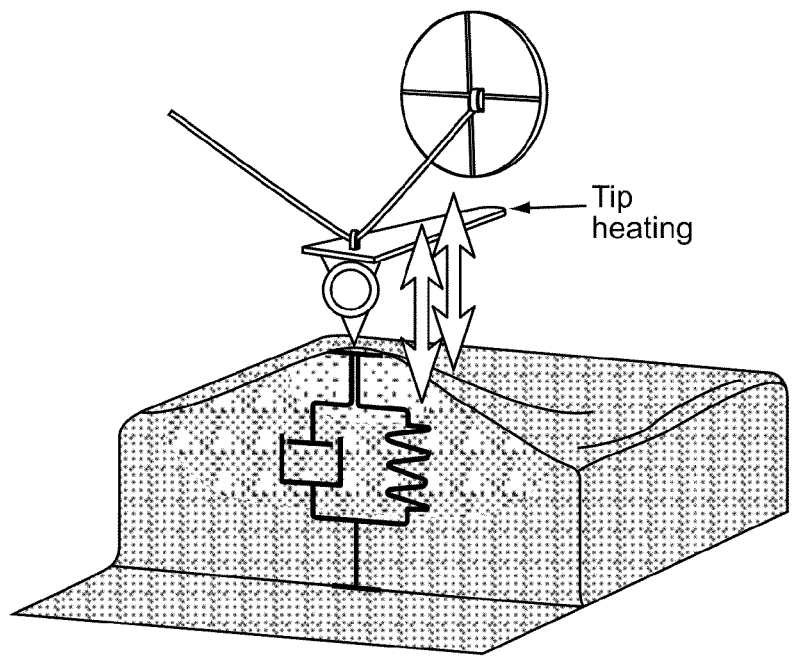
FIG. 2A is a schematic representation of a BE-SJThEM system.
Figure 2B:
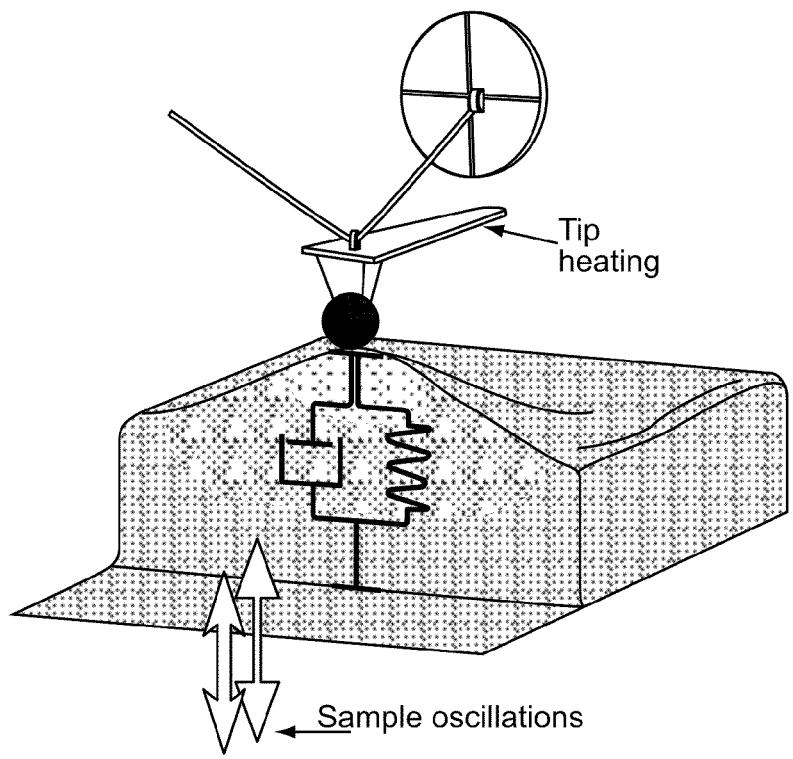
FIG. 2B is a schematic representation of a BE-AFAM system.

In FIGS. 1 and 2A, in the BE-SJThEM technique, a composite signal (AC-heating+DC-heating) generated, for example, by the controller module 22 is sent to the tip 26, resulting in periodic displacement of the tip 26 that is detected by the detector 30. Thermal expansion of the polymer (e.g., the sample 16) under the tip 26 causes the displacement of the tip 26 normal to the surface of the sample 16. In other words, no bulk oscillations of the sample 16 are performed in the BE-SJThEM technique. Referring to FIGS. 1 and 2B, in the BE-AFAM technique, tip 26 is heated to the temperature of interest while the sample 16 is macroscopically oscillated, for example, by the add-on module 20.

"Freeze-in" Method for Reproducible Resonance Frequency Measurements

Figure 3A:
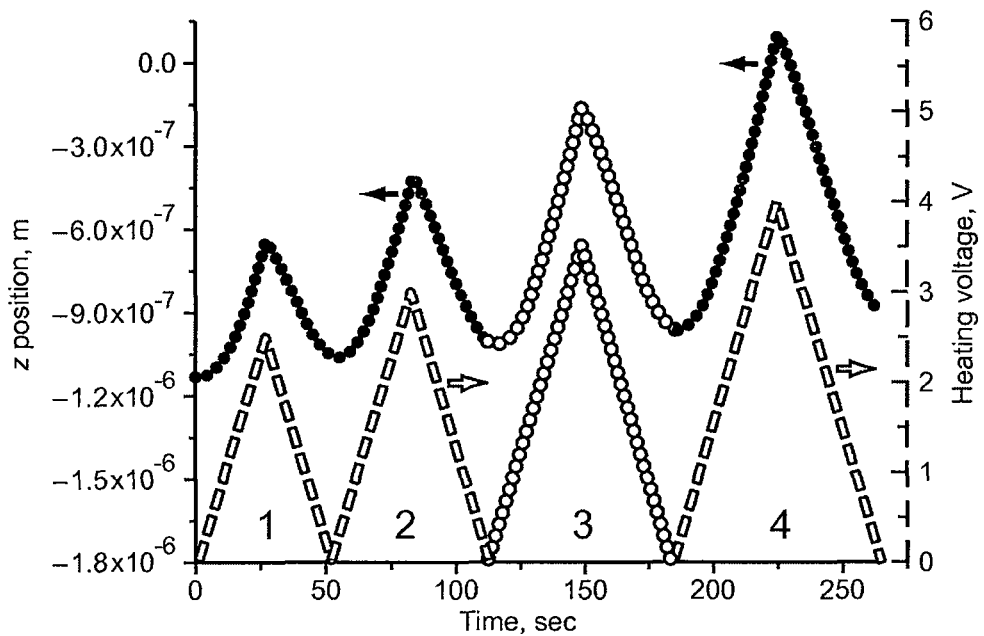
FIG. 3A is a plot of tip position as a function of time for constant indentation force with increasing peak heating voltages.
Figure 3B:
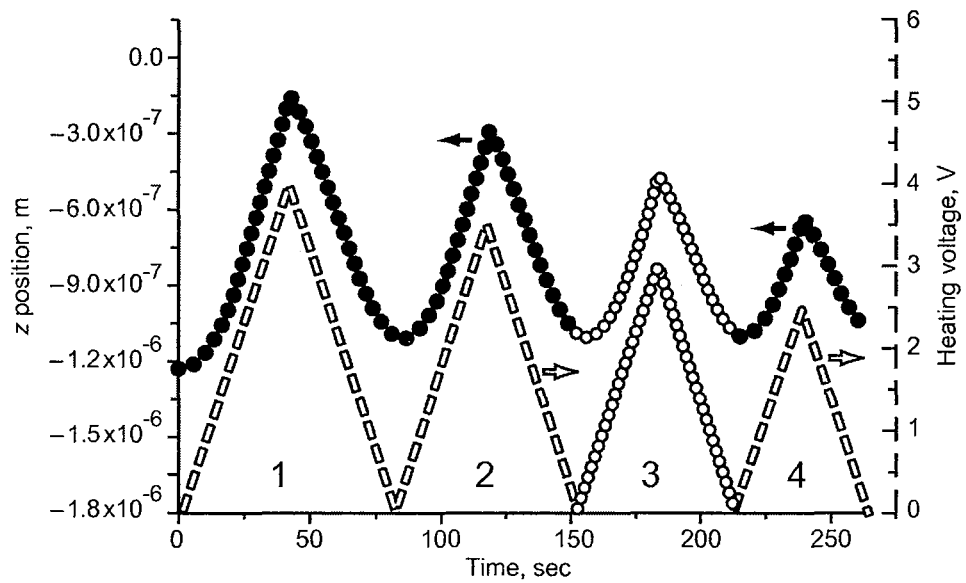
FIG. 3B is a plot of tip position as a function of time for constant indentation force with decreasing peak heating voltages.
Figure 3C:
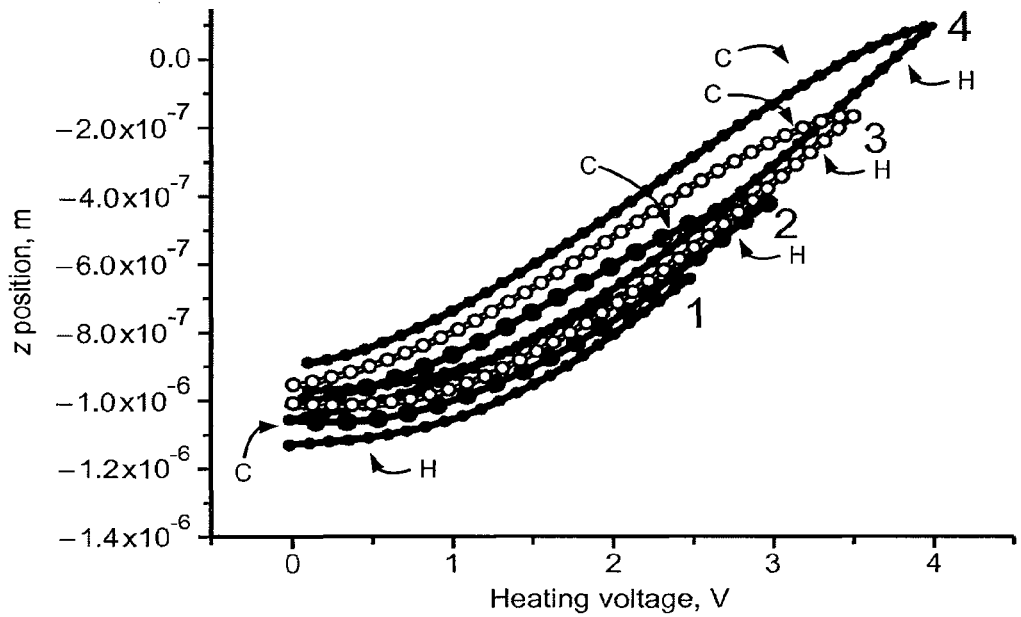
FIG. 3C is a plot of tip position as a function of heating voltage with increasing peak heating voltages.

In FIGS. 3A-3D, the evolution of vertical tip-deflection (standard LTA detection) as a function of time for increasing and decreasing heating regimes (heat/cool cycles) is illustrated. For both increasing and decreasing heating regimes, as depicted in each of FIGS. 3A and 3B a hysteresis loop is evident as a tip is heated and cooled and the polymer (the sample) beneath the tip expands and recedes. The use of heat/cool cycles with increasing peak voltages (increasing peak temperatures) results in corresponding shifts in the position of the tip. Specifically, a decrease in Z-position of the tip (the height of the tip) is observed as a peak tip temperature (voltage) is increased and an increase in Z-position is observed as the tip is cooled to ambient temperature. This effect, as depicted in FIG. 3C can arise from either a gradual increase in tip-surface contact area from cycle to cycle or an increase in free volume of the polymer mass as the polymer mass melts beneath the tip. In FIG. 3C, the respective heating and cooling curves of each cycle (e.g., 1, 2, 3, and 4) are designated as "H" and "L", respectively. The heating and cooling curves representative of cycle 3 have been illustrated with transparent circles.

Figure 3D:
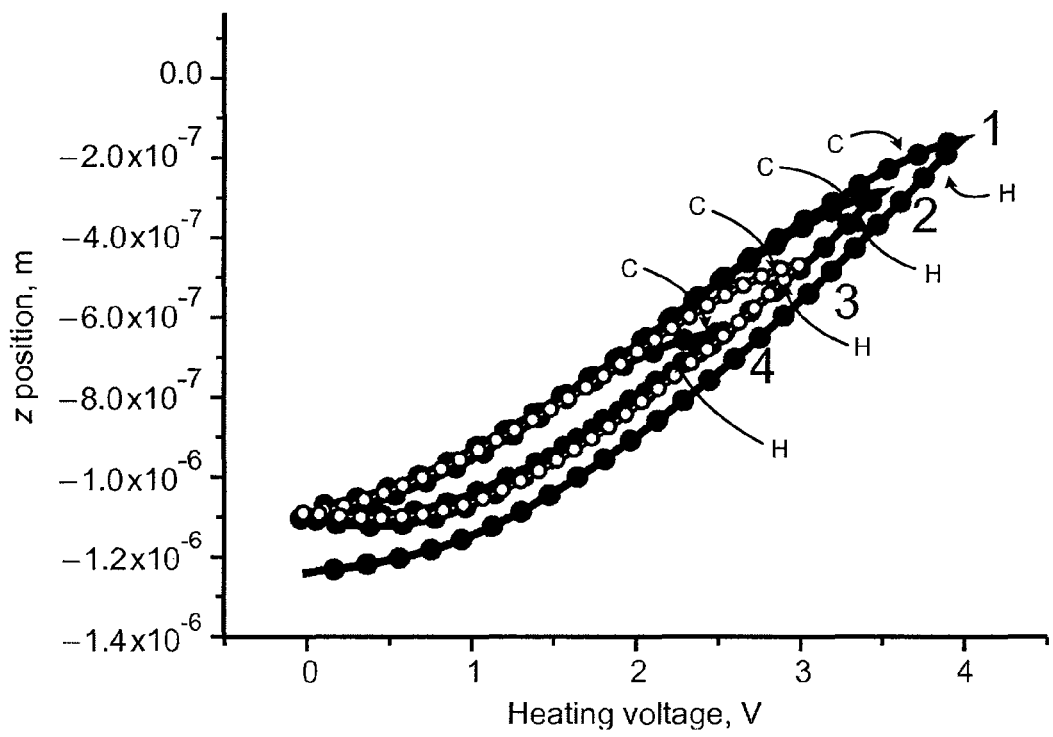
FIG. 3D is a plot of tip position as a function of heating voltage with decreasing peak heating voltages.

In comparison, the use of a heating regime where a maximum peak heating voltage is reached after a first heat/cool cycle, leads to the development of a hysteresis loop that overlaps and is reproducible after the first peak heat cycle as depicted in FIG. 3D. In FIG. 4C, the respective heating and cooling curves of each cycle (e.g., 1, 2, 3, and 4) are designated as "H" and "L", respectively. The heating and cooling curves representative of cycle 3 have been illustrated with transparent clear circles. This scenario is the result of the tip 26 "melting" into the surface of the sample on the first cycle such that the tip-surface contact area is maintained in subsequent cycles as the tip is "frozen" in place. In other words, the Z-position of the tip 26 relative to the sample 16 remains substantially fixed (substantially the same) after several cycles. This heating regime, when combined with cantilever deflection feedback-on operation, provides control of both the tip-surface contact area and maintenance of a constant force during the variable temperature cycle which constitute necessary preconditions for quantitative SPM data analysis (similar to the Oliver-Pharr method in nanoindentation).

In FIGS. 3A and 3B, the shapes of the respective hysteresis loops of the Z-position-voltage (temperature) curves substantially follow a parabolic function. Since measurements are performed in a constant force regime, the Z-position of the tip is a measure of the thermal expansion of the polymer. It is anticipated that the thermal expansion of the polymer is linear with respect to temperature if the tip-surface contact area, a, and force, P, are maintained constant ($\Delta L \sim \Delta T$ for a, P=const) and based on the assumption that the temperature of a tip is determined by Joule heating, $\Delta T \sim V^2$. The deviation of the position-temperature curve in FIGS. 3A and 3B, from the parabolic-like pattern and the observed hysteresis at high temperatures are presumably due to a combination of substrate thermal expansion, increased tip resistance, and thermal hysteresis of a cantilever shape.

Figure 4A:
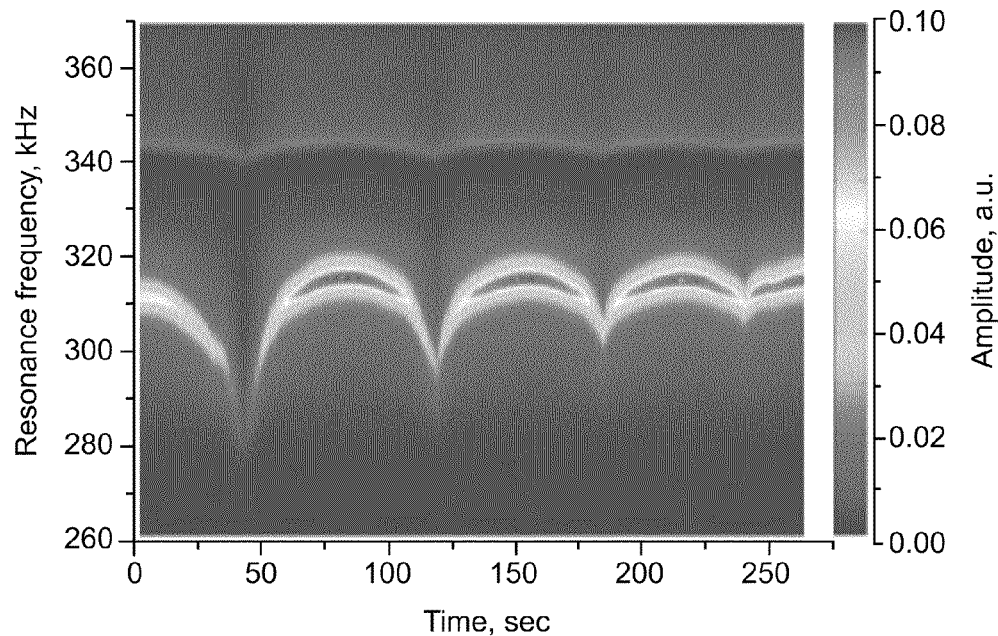
FIG. 4A is a spectrogram of the tip oscillation amplitude for the constant indentation force as a function of time.
Figure 4B:
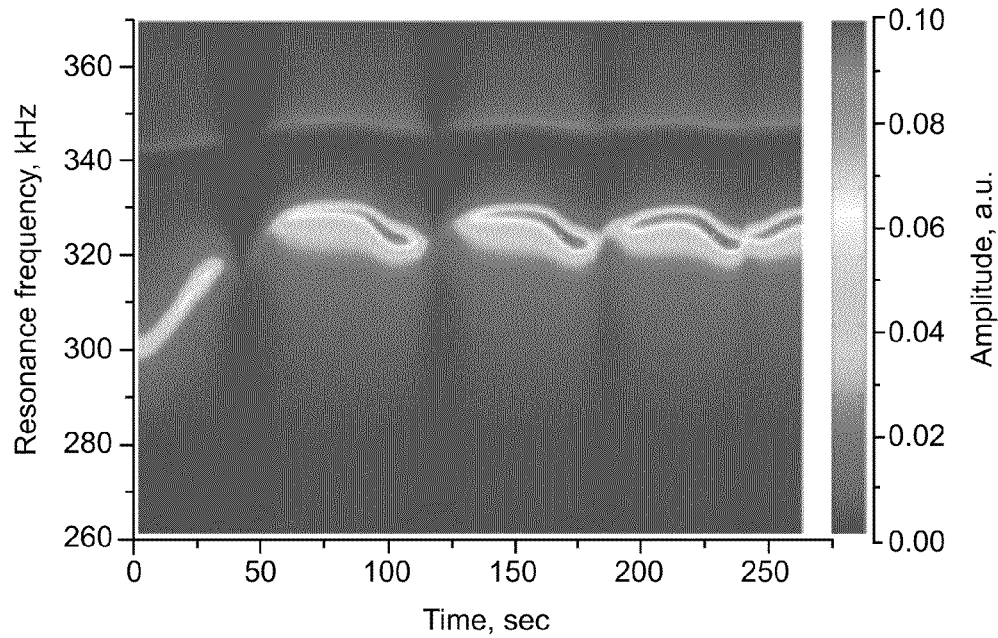
FIG. 4B is a spectrogram of the tip oscillation amplitude for constant tip position as a function of time.
Figure 4C:
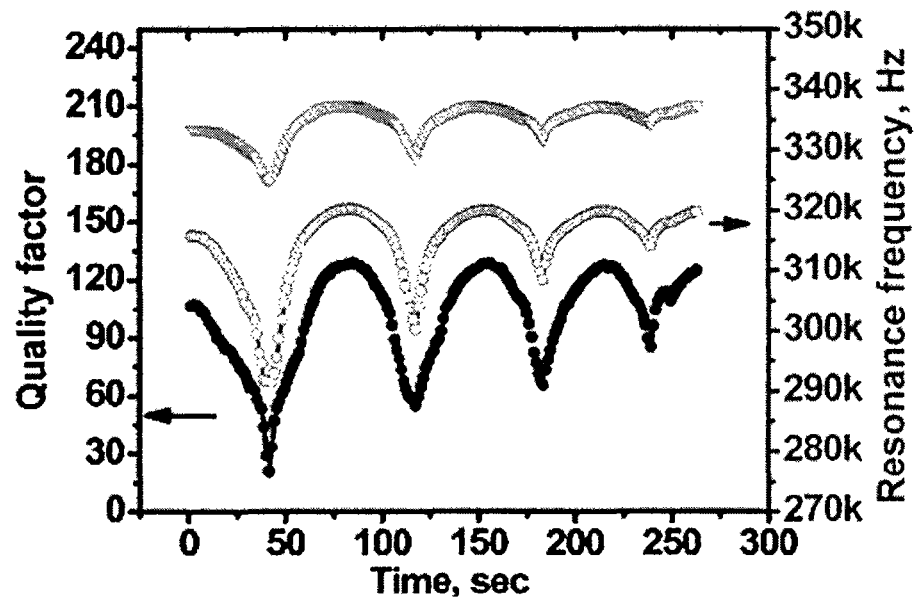
FIG. 4C is a plot of amplitude, resonant frequency, and quality factor of the tip-surface contact area for constant indentation force as a function of time.
Figure 4D:
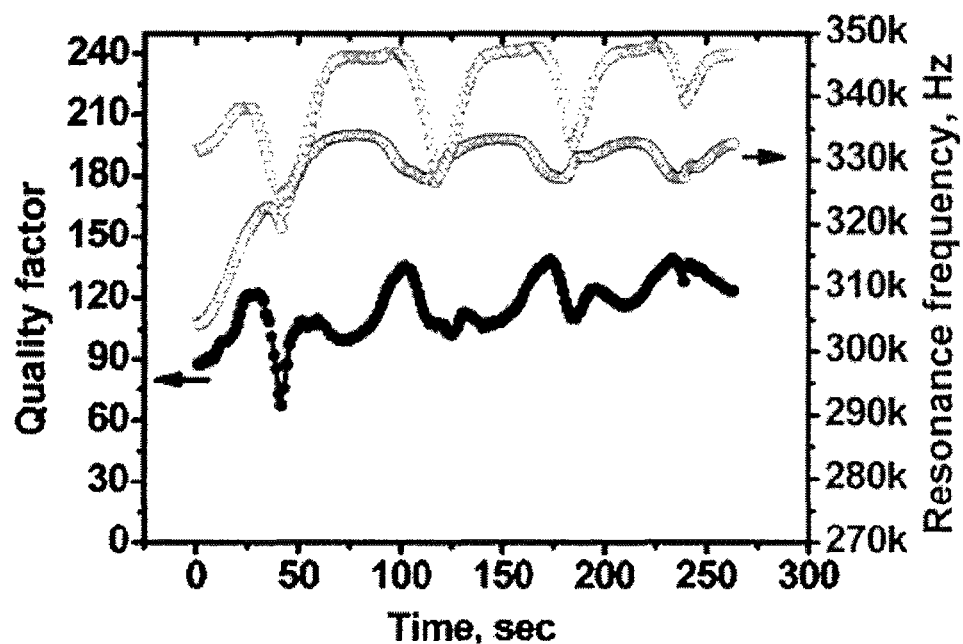
FIG. 4D is a plot of amplitude, resonant frequency, and quality factor of the tip-surface contact area for constant tip position as a function of time.
Figure 4E:
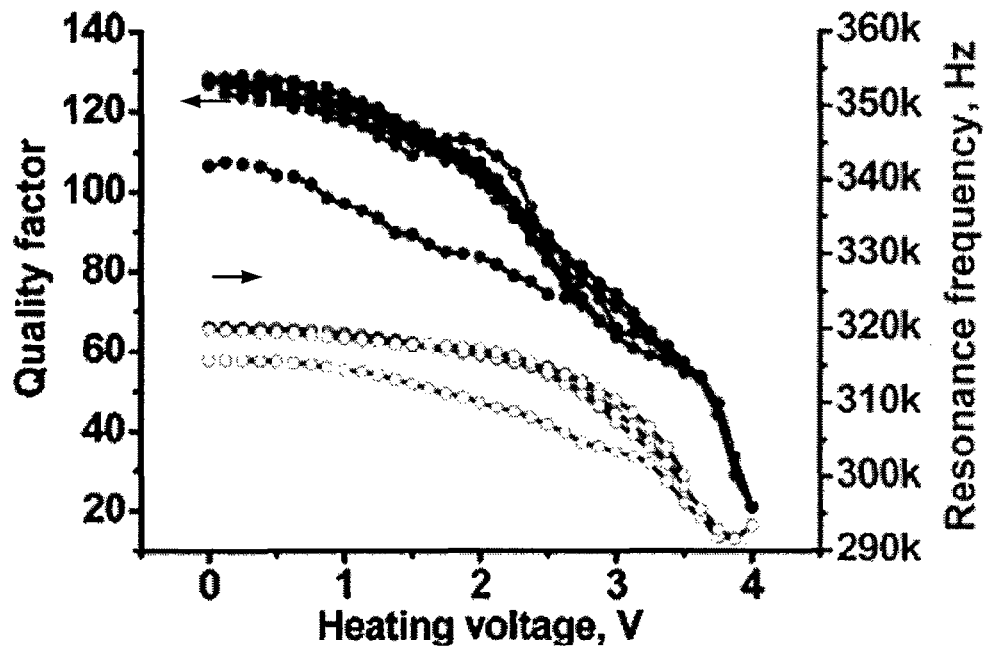
FIG. 4E is a plot of resonant frequency and quality factor for a constant indentation force as a function of heating voltage.
Figure 4F:
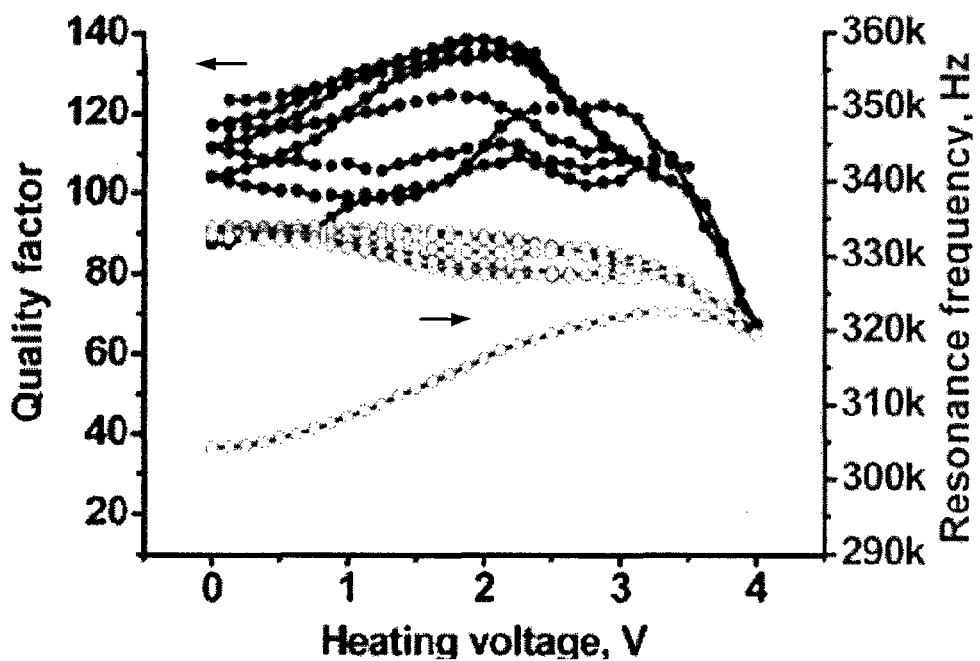
FIG. 4F is a plot of resonant frequency and quality factor for a constant tip position as a function of heating voltage.

In FIGS. 4A-4F, the temperature dependence of the mechanical properties of poly-etheylene terephthalate (PET) was probed using BE-AFAM. Many other polymers may have been utilized with the techniques of the present disclosure. FIG. 4A illustrates the oscillation amplitude of the tip 26 for a constant indentation force as a function of time. FIG. 4B illustrates the oscillation amplitude of the tip 26 for a constant position of the tip 26 as a function of time. FIG. 4C illustrates the amplitude, resonant frequency and quality factor of the tip-surface contact area for the constant indentation force as a function of time. FIG. 4D illustrates the amplitude, resonant frequency and quality factor of the tip-surface contact area for the constant position of the tip 26 as a function of time. FIG. 4E illustrates the resonant frequency and quality factor of the tip-surface contact area for the constant indentation force as a function of heating voltage. FIG. 4F illustrates the resonant frequency and quality factor of the tip-surface contact area for the constant position of the tip 26 as a function of heating voltage.

Note that in the constant force regime (the utilization of a constant indentation force), significant reproducibility was observed in the dynamic parameters (e.g., resonant frequency and quality factor) between subsequent heating/cooling cycles. In other words, the measured properties depend in large part on the temperature of the tip 26 and the experimental heat history, as shown in FIG. 4C, seems to lack any significant impact on the measured properties. In contrast, if a constant vertical position of the tip 26 is maintained (vertical feedback turned off), the hysteresis of the quality factor and resonant frequency as a function of voltage is not reproducible as shown in FIG. 4F which is indicative of a change in tip-surface geometry. Note that the apparent increase in stiffness of the tip-surface contact area on the first cycle of heating is due to an expansion of the material of the sample 16 that results in an increased indentation force.

The observed decrease in quality factor and resonance amplitude of the tip-surface contact area is indicative of softening and melting experienced at the polymer (e.g., the sample 16). When the polymer melts, the coupling between the tip 26 and surface of the sample 16 decreases significantly, as evidenced by the observed decrease in amplitude. Simultaneously, the Q factor for the mechanical resonance decreases due to viscous damping in the molten polymer as shown in FIGS. 4B and 4C.

Figure 5A:
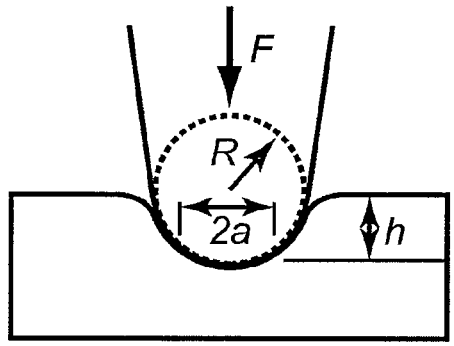
FIG. 5A is schematic of the tip-surface contact area with constant indentation depth.
Figure 5B:
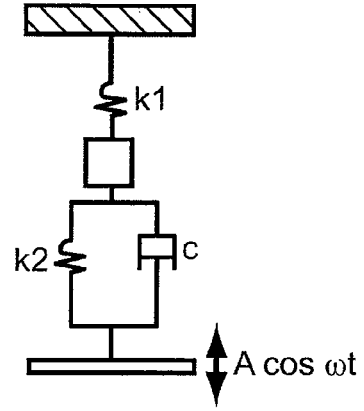
FIG. 5B is an equivalent model for the tip-surface contact area.

FIG. 5A illustrates a schematic of the tip-surface contact area with a constant indentation depth h. FIG. 5B illustrates an equivalent model of the tip-surface contact area. The spring constant $k_1$ is the stiffness of free cantilever 24, m represents the effective mass of the cantilever 24, $k_2$ is the tip-surface contact stiffness, and c is the viscosity of the polymer. The change in resonance frequency can be attributed to either changes in the effective dissipation or effective material properties. For a damped oscillator, the resonant frequency decreases with the decrease of Q as:

$$f_{res} = f_0 \sqrt{1 - 1/Q^2} \qquad (4)$$

Equation 4 predicts a 0.3% decrease in the resonant frequency during the heating cycle (taking Q values from FIG. 4E), as compared to the experimentally observed 10% decrease in resonant frequency. Therefore, the decrease in resonant frequency is ascribed to a decrease in the contact resonance stiffness only. Using the approximate formulae, the resonant frequency of the cantilever 24 is $\omega_{res} \cong (15.5-89.7 \, k_1/k_2)\sqrt{k_1/m}$. Resonance frequency of cantilever bound to a perfect solid body ($k_2 \rightarrow +\infty$) is $\omega_{0 \, BOUND} \cong 15.5\sqrt{k_1/m}$. Thus, $$\omega_{res} \cong \left(1 - 5.8\frac{k_1}{k_2}\right)\omega_{0BOUND} \quad (5)$$

Figure 5C:
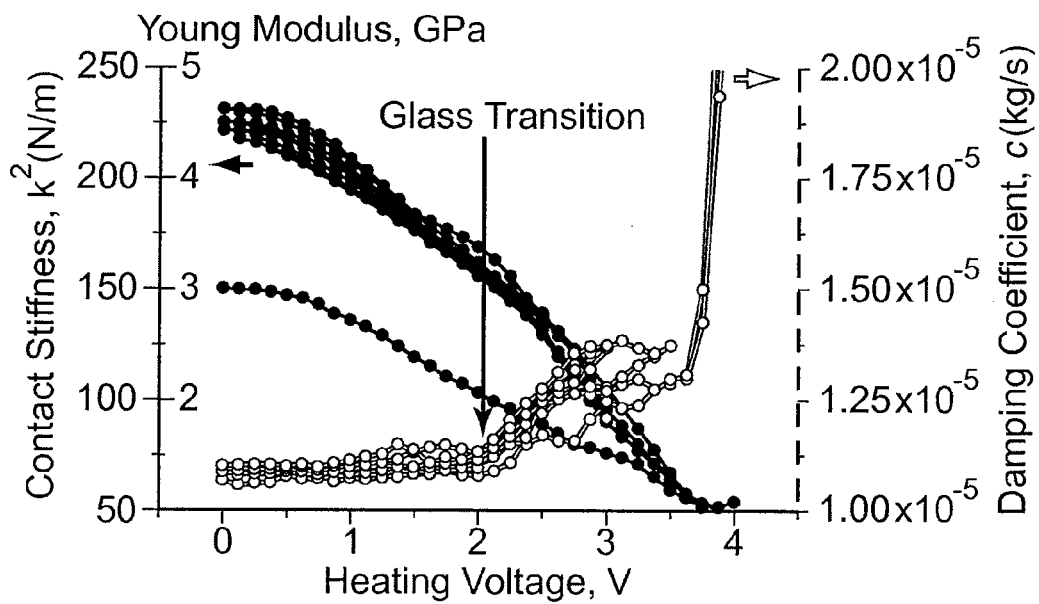
FIG. 5C is a plot of local Young's modulus and damping coefficient for PET sample as a function of temperature.

Estimating a constant area between the tip 26 and the surface of the sample (with the radius a=50 nm) and taking Young's modulus for PET at room temperature as E=3 GPa and $k_2$=2aE, the relative change in contact stiffness may be extracted for the tip-surface contact area as a function of temperature as shown in FIG. 5C. In this analysis, it is assumed that the spring constant of the cantilever 24 is temperature independent. This assumption holds within 10% error.

The damping coefficient, c, as a function of temperature can be extracted from the temperature dependence of the Q factor (assuming Q>>1), as shown herein:

$$c \cong \frac{\sqrt{m(k_1 + k_2)}}{Q}\left(2 - \frac{3}{Q}\right) \quad (6)$$

FIG. 5C illustrates the dependence of c as a function of temperature based on the assumption that the tip mass=2.2× $10^{-9}$ kilograms (kg) (recalculated from $\omega_{0\ bound}$) and $k_j$=1 N/m. The two transitions at 2V and 3.8V that are seen after the first heat/cool cycle are presumably associated with the recrystallization and melting of the sample 16 that occurs after the first heating cycle.

Methods for Transition Temperature Mapping

A phase transition temperature can be determined using the change of the mechanical parameters as function of temperature in the static regime as well as by superimposing the heating waveform on top of tip oscillations in close proximity of the surface of the sample 16. The parameters for phase transition detection include but are not limited to: (a) the drop in quality factor as a function of temperature, (b) the increase of the damping coefficient as a function of temperature, (c) the change in resonance frequency during initial melt-in of the tip 26 into the sample 16, (d) the measurements of amplitude, quality factor, resonance frequency, and phase of multiple contact resonances as function of temperature. The transitions temperatures can be established from comparison of recovered dependences of local thermomechanical properties with macroscopic analogs. These methods will be explained in details below.

Drop in Quality Factor as a Function of Temperature

Figure 6A:
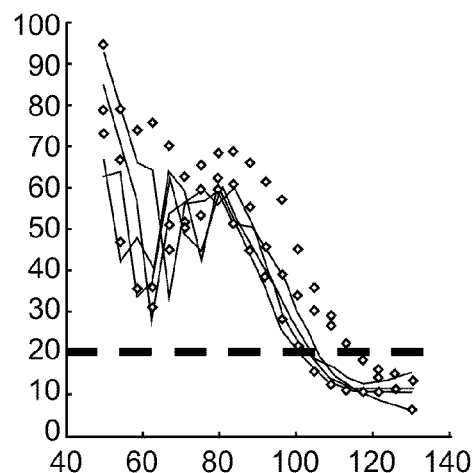
FIG. 6A is a plot illustrating the dependence of quality factor of the tip-surface contact area as a function of tip temperature.
Figure 6B:
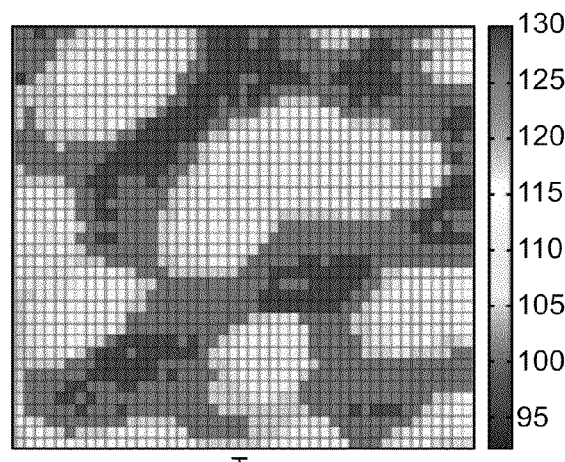
FIG. 6B is a spatially resolved glass transition temperature map of local Young's modulus and damping coefficient for a PET sample as a function of temperature.
Figure 6C:
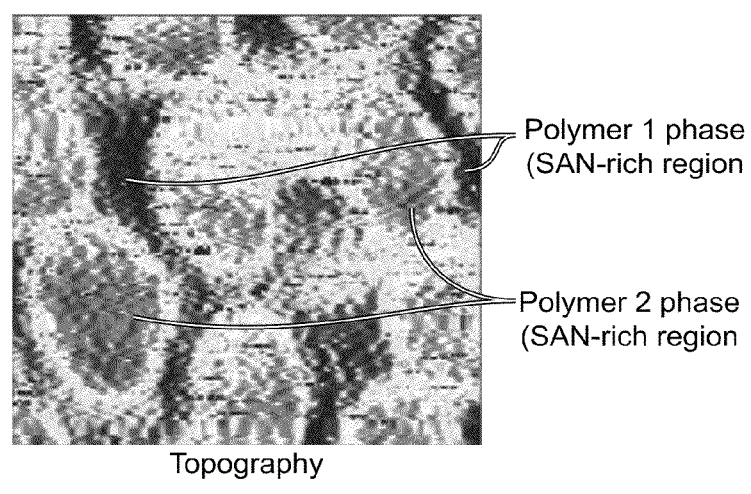
FIG. 6C is a spatially resolved glass transition topography map

In polymeric materials, the quality factor (Q) of the tip-sample contact area decreases as a function of temperature as depicted in FIG. 6A. This behavior can be used for the determination of glass transition temperature for polymeric materials. The threshold of Q=20 may be used to recover glass transition maps taken on a phase-separated sample consisting of PMMA and SAN polymers. It is believed that protrusions on the surface correspond to SAN phase with glass transition temperature of 115° C., while the rest of the sample is PMMA with Tg ~95° C. FIGS. 6B and 6C illustrate a good correspondence between the topography image and the glass transition map.

Increase of Damping Coefficient as a Function of Temperature

In materials, a phase transition is associated with an increased damping coefficient. FIG. 5C shows an increase of damping coefficient with heating after going through glass transition temperature of the material. Thus, this parameter can also be used for determination of glass transition temperature. The temperature at which the damping coefficient exceeds a threshold value is referred to as the glass transition temperature, similar to the approach demonstrated in section.

Change in Resonance Frequency During Initial Melt-in of the Tip 26 into the Sample 16

At the temperature of phase transition, there exists a noticeable change in functional dependence of resonance frequency as function of temperature. On the first heating cycle, when the contact area between the tip 26 and the sample 16 is not fixed, this effect is even more pronounced as illustrated in FIG. 4E (interval of temperatures around 2 V). This behavior is strongly material dependent and can indicate a sharp increase in resonance frequency indicating the stiffening of tip-sample contact area often times due to an increase in contact radius of the tip 26 or the change in functional dependence of resonance frequency vs. temperature. Resonance frequency can also be used for the determination of a glass transition temperature. The glass transition temperature is a temperature at which a change in behavior of resonance frequency relative to temperature occurs.

Use of Second Harmonic of Contact Resonance to Exclude Contact Area from the Consideration while Measuring Temperature Dependencies of the Mechanical Properties of the Sample 16

The contact between the tip 26 and the surface of the sample 16 is strongly non-linear. Rabe et al. illustrated that resonance frequencies of a clamped beam strongly depend on a clamping efficiency. The change in mechanical properties of materials as a function of temperature results in a change of the clamping efficiency. The temperature dependencies of the resonance frequencies can be easily measured. Nomograms for the contact resonance frequencies as a function of the Young's modulus of a material can be used for the determination of Young's modulus as a function of temperature. Then, a phase transition temperature can be extracted from temperature dependence of Young's modulus.

Contact Mechanics and Resolution

The understanding of a response of a material to a temperature gradient requires knowledge regarding temperature dependent contact mechanics of the tip-surface contact area. From simple dimensionality arguments, the thermal response of a material, $\delta l$, is linear and related to temperature variation, $\delta T$, through the thermal expansion coefficient, a, and characteristic tip-surface contact radius, $R_o$, based on the relationship $\delta l = a\delta T R_o$.

To establish the contact mechanics model, it is necessary to solve the equations of state for an isotropic elastic media in a presence of a heat transfer. The mechanical stress tensor $\sigma_{ij}$ and elastic strain $\mu_{ij}$ are linked as $\delta_{ij}a\delta T + S_{ijkl}\sigma_{kl} = \mu_{ij}$, where $\delta_{ij}$ is the Kroneker delta, $S_{ijkl}$ is the tensor of elastic compliances. The general equation of mechanical equilibrium, $\partial\sigma_{ij}/\partial x_j = 0$, leads to the equation for the mechanical displacement vector, $\mu_i$, as:

$$c_{ijkl}\frac{\partial^2 u_k}{\partial x_i \partial x_l} - c_{ijkk}a\frac{\partial \delta T}{\partial x_i} = 0. \quad (7)$$

Here the boundary conditions of the free space S:

$$\left(c_{ijkl}\frac{\partial u_k}{\partial x_l} - c_{ijkk}a\delta T\right)n_j\bigg|_s = 0. \quad (8)$$

Where $c_{ijkl}$ is the tensor of elastic stiffness, and $n_j$ are the normal components. The maximal surface displacement (corresponding to the point x=0) below the tip is, $$u_3(0, t) = \frac{1+v}{\pi} \int\int_{\zeta_3 \rangle 0}\int \frac{\zeta_3 a \delta T(\zeta, t)}{(\zeta_1^2 + \zeta_2^2 + \zeta_3^2)^{3/2}} d\zeta_1 d\zeta_2 d\zeta_3 \quad (9)$$

where $G^S_{ij}$ is the appropriate tensorial Green's function. The temperature distribution is found as a solution of Laplace's equation $\kappa^2 \nabla^2 \delta T (x, t)=0$, where the $\kappa^2=\chi/c\rho$ is the thermal diffusivity of the media, $\chi$ the thermal conductivity (W/(m K)$^{-1}$], c is the specific heat (J(kg K)$^{-1}$), and $\rho$ is density kg m$^{-3}$). After integration, the following is derived:

$$\mu_z(0) \approx (1+v) a \delta T R_0 \quad (10)$$

While the numerical prefactor in equation (10) depends on the choice of boundary conditions (e.g., zero temperature, zero flux, or mixed) on the free surface, the overall functional form is universal as dictated by dimensionality considerations. Physically, there are two limiting cases for boundary conditions: (1) zero temperature outside of the contact (provides smallest values of strain) and (2) zero flux outside of the contact (provides largest values of strain), which give the prefactors in Equation (10) of 1 and $\pi/2$, respectively. For all other boundary conditions the prefactors in Equation (10) will lie in 1-$\pi/2$ range. If the mean value of the prefactor range is chosen, the model error will not exceed 30%, which is comparable with the experimental error ~10% (especially given the uncertainty in the contact radius).

From equation (10), the measured signal in SJThEM can be found as T R$\approx$(1+v)aR$_0$. At the same time, the BE-AFAM signal is given by the standard contact stiffness k*=2R$_0$·E, where E is a temperature dependent indentation modulus. Note that this analysis is valid only in the freeze-in method, and will not be applicable to coupled thermomechanical contact.

The choice of a static (zero frequency) regime is justified by the fact that the temperature drops exponentially with distance from the contact area.

$$T(r) = T_0 \frac{r_{cont}}{r} \exp\left(-(r-r_{coat})\sqrt{\frac{\omega}{2\kappa}}\right) \exp\left(i\left(\omega t - (r - r_{coat})\sqrt{\frac{\omega}{2\kappa}}\right)\right) \quad (11)$$

The characteristic thermal length is determined to be either d=$\sqrt{(2\kappa/\omega)}$ or the contact radius (whichever value is smaller), where $\omega$ is the frequency of incoming heat waves. For the material of interest (PET), the characteristic length at experimental frequencies (~500 kHz) is about 500 nm which much larger than contact radius (~10-100 nm) of the tip 26. Thus, the major temperature drop occurs at distances between one and two contact radii from the center of the tip 26. Hence, the measured thermomechanical response is directly related to contact radius which in turn is determined by indentation force and Young's modulus. Thus the ultimate limit of resolution in thermomechanical measurements is the contact radius, which can be as small as the tip radius (~10 nm).

The system utilizes a protocol that maintains a substantially constant contact radius by melting the tip 26 into the surface of the sample 16 on the first run or cycle, referred to as the "freeze-in" method, and measuring the mechanical properties of the tip-surface contact area on subsequent runs, or cycles. This heating protocol allows for the measure of the temperature dependence of Young's modulus by substantially maintaining a constant contact radius between the probe 26 and the sample 16. Thus, the ultimate limit of resolution in thermomechanical measurements is contact radius, which can be as small as the radius of the tip 26 (e.g., ~10 nm). The resolution of 10 nm is comparable with characteristic physical length scale in polymeric, as analyzed below.

Sensitivity, Band Width, and Noise Level

The resolution and sensitivity limits for the BE-LTA tip may be estimated. The vertical sensitivity level in static AFM (e.g., contact mode) is estimated as ~0.1 nm (experimental noise limit for conventional photodetectors). For ac-detection methods based on amplitude or frequency detection, the vertical sensitivity as limited by the thermomechanical noise is $\delta l_{tm} \approx \sqrt{2k_B TB/k\omega_r}$, where $k_B$ is Boltzman constant, T is the temperature, B is a measurement bandwidth, K is the cantilever spring constant, and C0r is the cantilever resonant frequency. This yields the relationship between resolution and sensitivity as, $$\frac{\delta l}{R_0} \approx -(1+v) a \delta T.$$

For typical polymer polyethylene terephthalate (PET) materials, Poisson's ratio is about 0.34 and the thermal expansion coefficient is 25-92/μm/(m·° C.) for the typical cantilever parameters of k~1 N/m, $\omega_r$~2π 300 kHz (contact resonance frequency), and B~1 kHz (typical experimental bandwidth). At room temperature (300K), the thermomechanical noise will be on the order of 3 pm. Lowering temperature to 4K results in the order of magnitude decrease of thermomechanical noise ($\delta l$~0.3 pm).

Figure 7A:
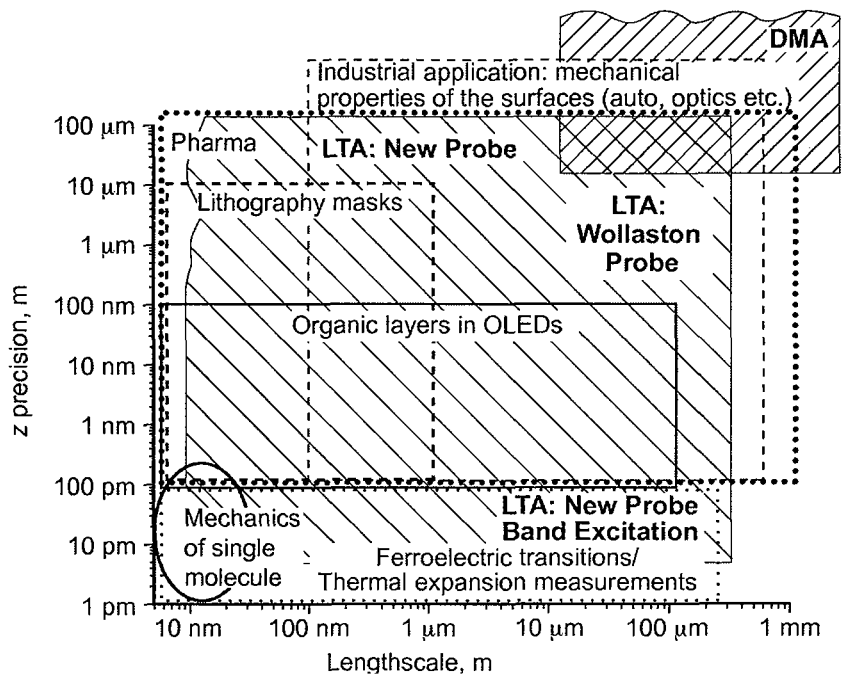
FIG. 7A is a plot of local thermomechanical characterization techniques.
Figure 7B:
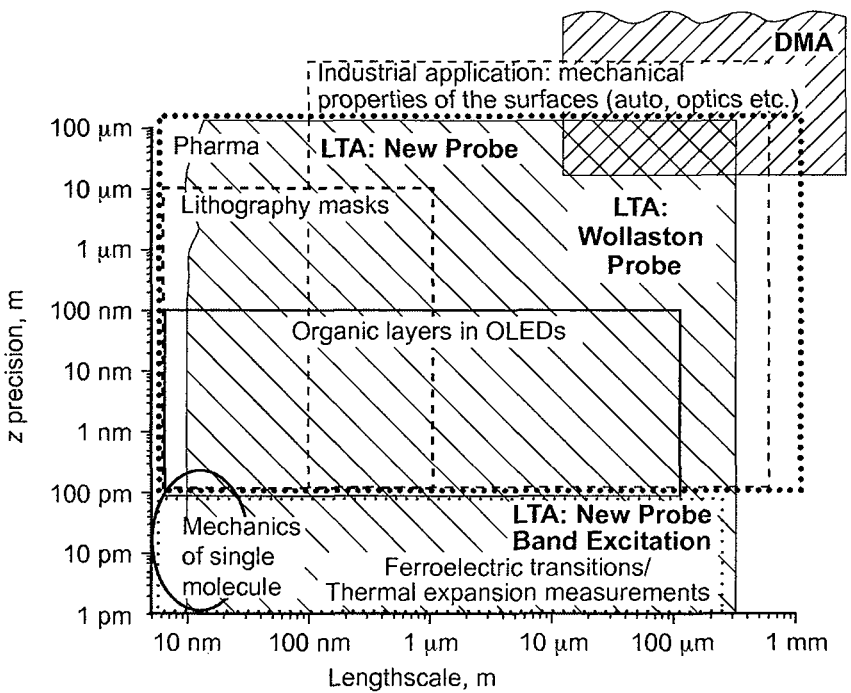
FIG. 7B is a plot of local thermomechanical characterization techniques.

The sensitivity and resolution limits for existing techniques for local thermomechanical characterization including Dynamic Mechanical Analysis (DMA), Local Thermal Analysis (LTA) with Wollaston probe, LTA with silicon probe, as well as the LTA-BE technique developed herein are presented in FIGS. 7A and 7B for 300K and 400K, respectively. Overlaying the capabilities of the methods listed and industrial requirements on the same plot allows one to see that LTA—silicon probe/BE significantly widens the window of applications of local thermal analysis techniques, and potentially opens the pathway for probing thermomechanical properties on the molecular level.

Macroscopic Characterization

Figure 8A:
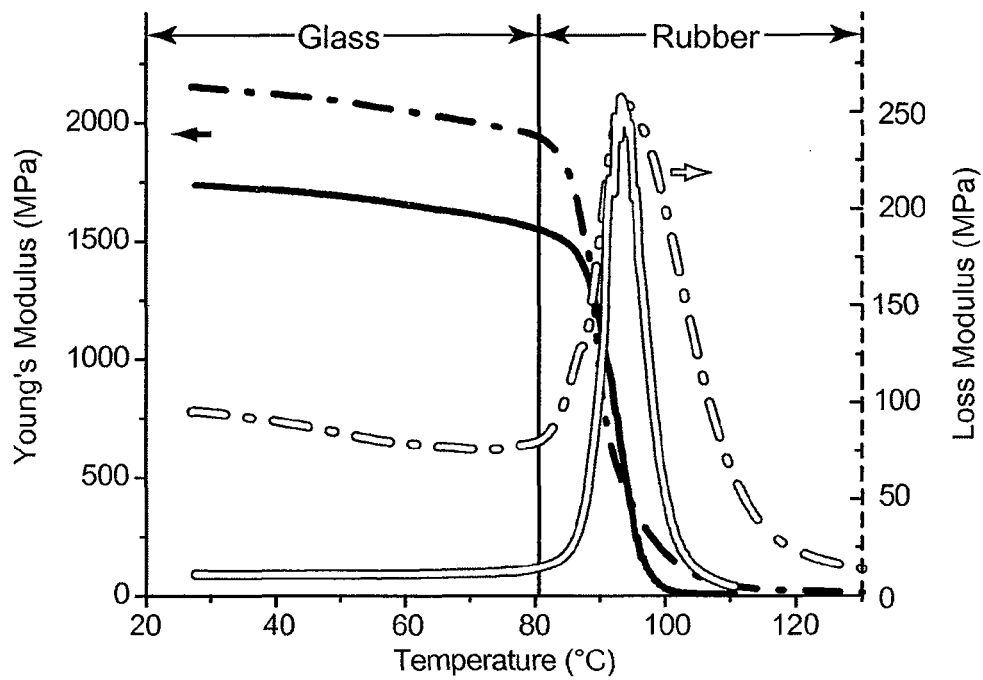
FIG. 8A is a plot of Young's modulus and loss modulus of semi-crystalline PET9921 and amorphous PETG6763 as a function of temperature.
Figure 8B:
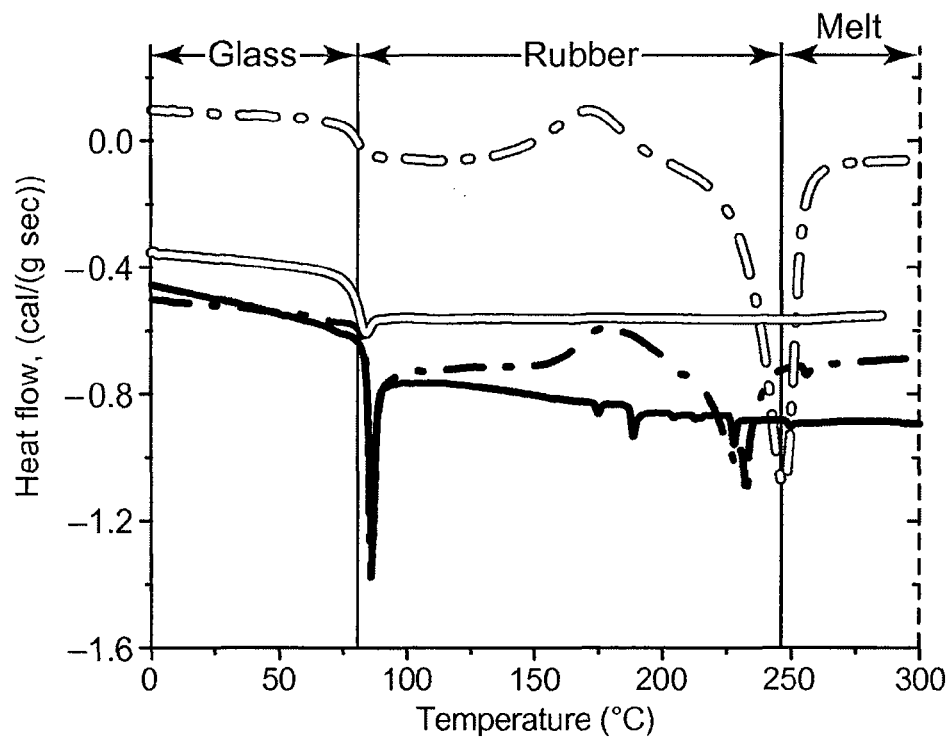
FIG. 8B is a plot of Young's modulus and loss modulus of semi-crystalline PET9921 and amorphous PETG6763 as a function of temperature.

Referring now to FIGS. 8A and 8B, the dependence of the mechanical properties of semi-crystalline PET9921 (depicted as dash-dotted lines) and amorphous PETG6763 (depicted as solid lines) as a function time temperature is shown. Bulk differential scanning calorimetry (DCS) measurements show a sharp endothermic transition in PET9921 and PETG6763 samples at ~85° C. which is usually associated with a glass transition in the polymer. In FIGS. 8A and 8B, the first DCS scan with regards to both the PET9921 and PETG6773 samples is illustrated with black colored lines, and the second DCS scan with respective to both the PET9921 and PETG6773 samples is illustrated in white colored lines. Another endothermic transition starts at ~150° C. and is present only in PET9921. This transition at 150° C. is attributed to the crystallization of the crystallizable polymer segments in PET9921 during the DSC experiment. The sharp endothermic transition at 250° C. is associated with polymer melting. Sharp endothermic transition in both materials is accompanied by the significant change in mechanical properties including a sharp drop of Young's modulus and a peak in the loss modulus. The sharp endothermic peak at ~85° C.

transforms into a small endothermic step for both samples on the second DCS scan. The magnitude of the endothermic peak is reduced after the second DSC scan as a consequence of polymer heating and quenching after the first DSC scan which effectively increases its free volume and enthalpy. This endothermic peak is associated with a molecular or volume relaxation that occurs in amorphous polymers held below their phase glass transition temperature. The molecular relaxation often leads to changes in structure-dependent properties such as modulus, creep compliance, stress-relaxation, refractive index, and dielectric constant. This change in a materials properties are manifestations of molecular relaxations towards equilibrium. This process is often referred to as physical aging. Addressed below is the potential of SPM based local thermal analysis to distinguish the reproducibility of local behavior, specifically the ability to detect the glass transition at ~85° C.

BE-AFAM and BE-SJThEM Measurements

The reproducibility in mechanical property measurements enabled by the use of the "freeze-in" technique disclosed herein allows for the comparison of the BE-AFAM and BE-SJThEM microscopy techniques. In both embodiments, as mentioned above, the frequency band of 300 kHz width centered at 300 kHz was applied to, in the case of AFAM, to excite oscillations of the sample 16 or, in the case of BE-SJThEM, to heat the tip 26. The resonant frequency of the resulting oscillations of the tip 26 was similar for both the BE-AFAM and BE-SJThEM, since the contact resonant frequency reflects the mechanical properties regardless of the measuring method used.

The amplitude of tip oscillations initially increases with temperature and then goes through a maximum in the BE-SJThEM heating implementation. While quantitative modeling of the temperature dependence of the amplitude is quite complex and involves tip-sample heat transfer, the exact contact geometry, and the thermal expansion properties of the material etc., the basic physical concept is straightforward. For the low temperature regime, the amplitude of the oscillations increase because of the increase in temperature gradient between the tip 26 and the surface of the sample 16. This event is followed by an increase in the thermal expansion of the material (e.g., the sample 16). Effectively, the increase in temperature results in the increase of driving force for the oscillations. At the same time, softening of the material initially improves mechanical coupling between tip 26 and surface of the sample 16 thus increasing the amplitude of induced oscillations. When the temperature approaches the glass transition temperature, the polymer (the material or sample 16) becomes soft such that the force exerted on the tip 16 by the material is not sufficient to drive the oscillations. Thus, the maximum on the amplitude curve corresponds to the drastic change in the polymer stiffness, associate with glass transitions.

Glass Transition

Figure 9A:
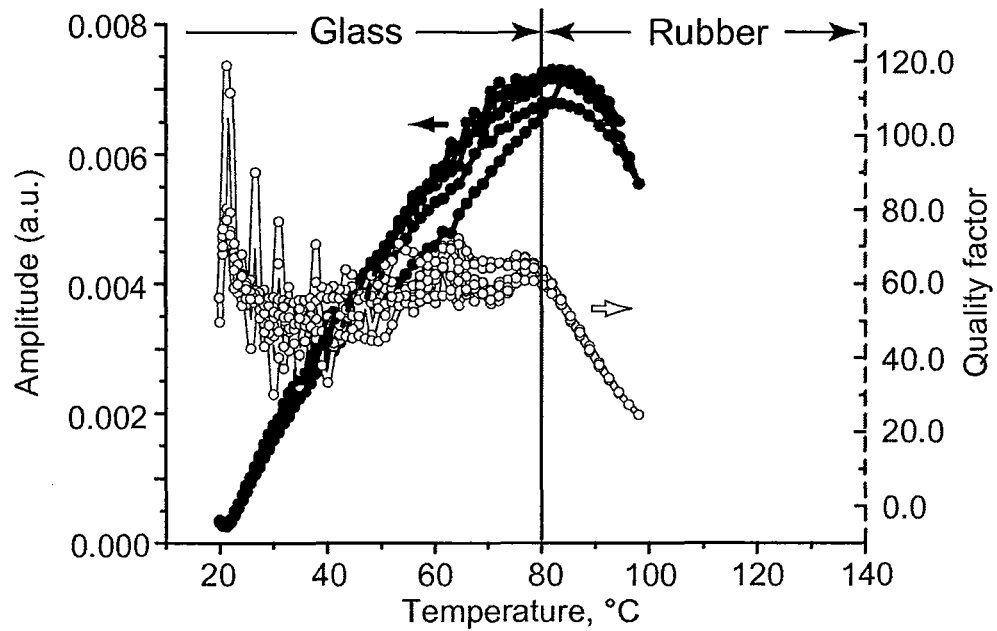
FIG. 9A is a plot of the amplitude and the quality factor of tip oscillations induced by BE-SJThEM on amorphous PETG6763 as a function of temperature.
Figure 9B:
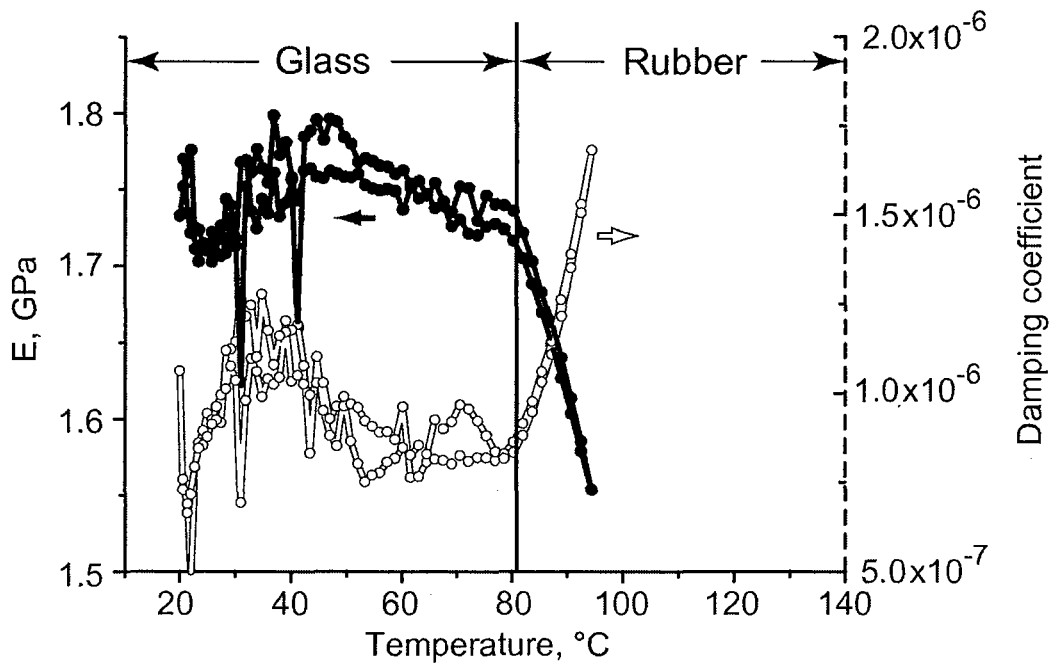
FIG. 9B is a plot of Young's modulus and damping coefficient re-calculated from oscillation parameters obtained by BE-SJThEM on amorphous PETG6763 as a function of temperature.
Figure 9C:
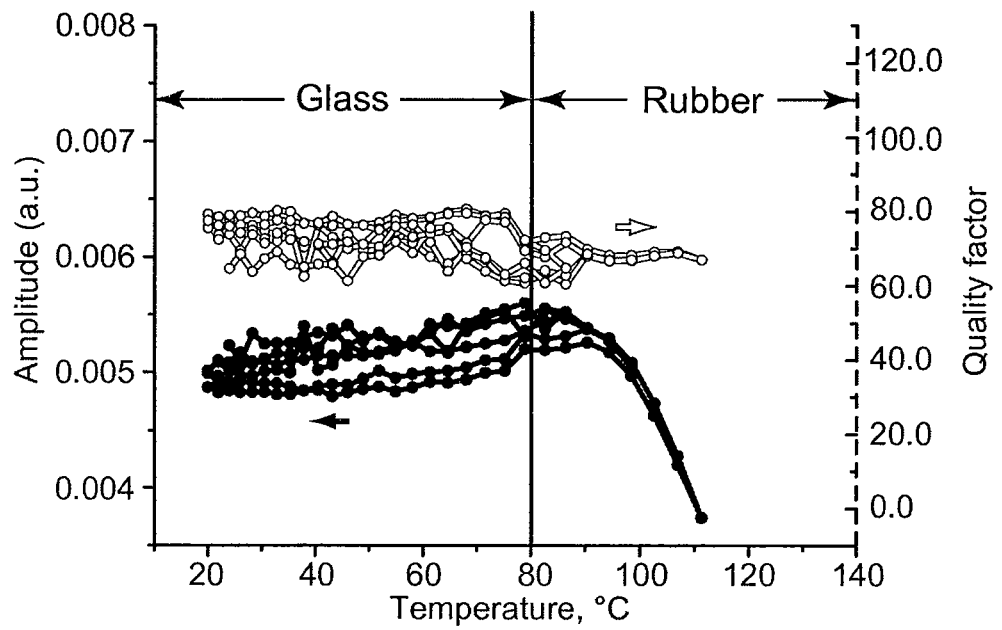
FIG. 9C is a plot of the amplitude and the quality factor of tip oscillations induced by BE-AFAM on amorphous PETG6763 as a function of temperature.
Figure 9D:
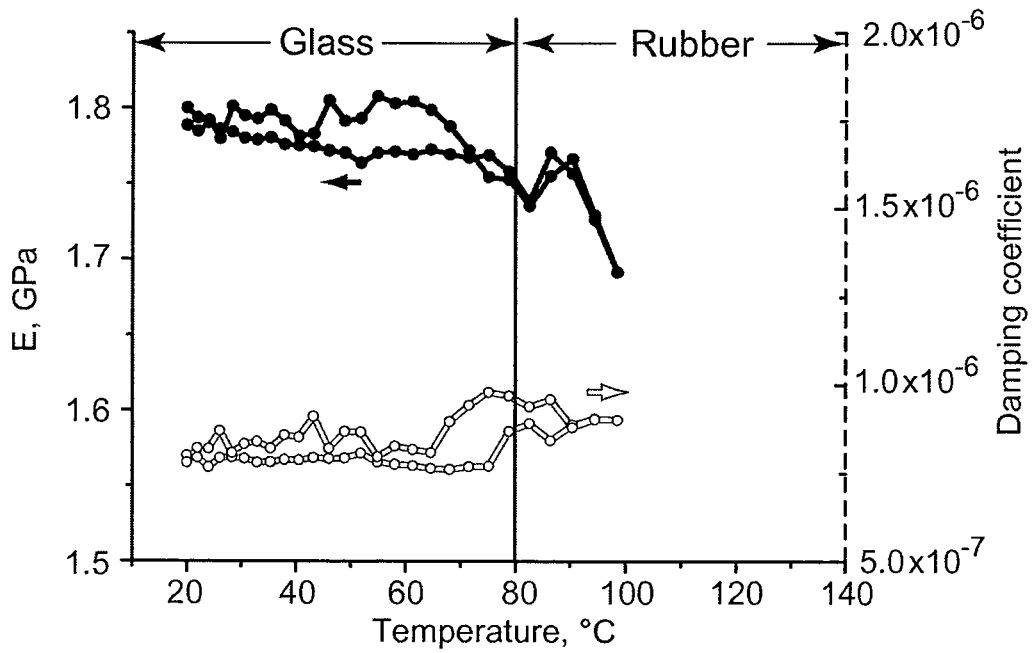
FIG. 9D is a plot of Young's modulus and damping coefficient re-calculated from oscillation parameters obtained by BE-AFAM on amorphous PETG6763 as a function of temperature.

Referring now to FIGS. 9A-9D, SBE-LTA tip spectroscopy of PETG6763 is illustrated in comparison with BE-AFAM. FIGS. 9A and 9C depict the temperature dependence of amplitude and quality factor for both techniques. Specifically, FIG. 9A is a plot of the amplitude and the quality factor of tip oscillations induced by BE-SJThEM on amorphous PETG6763 as a function of temperature. FIG. 9C is a plot of the amplitude and the quality factor of tip oscillations induced by BE-AFAM on amorphous PETG6763 as a function of temperature. FIG. 9B is a plot of Young's modulus and damping coefficient re-calculated from oscillation parameters obtained by BE-SJThEM on amorphous PETG6763 as a function of temperature, and FIG. 9D is a plot of Young's modulus and damping coefficient re-calculated from oscillation parameters obtained by BE-AFAM on amorphous PETG6763 as a function of temperature.

The glass transition of PETG6763 at 85° C. can be detected by both techniques as an amplitude maximum, a decrease of quality factor, a decrease of Young's modulus, and an increase of damping coefficient for BE-SJThEM technique or as a decrease of amplitude and a decrease of Young's modulus for BEAFAM. For BE-AFAM the amplitude of induced oscillations stays constant until the temperature reaches the glass transition temperature. This is due to the fact that the sample itself is oscillated externally and the material transfers the oscillations very efficiently. Only when softening of the material starts to occur does the efficiency of oscillation transfer of the material decrease. This effect does not result in a noticeable change of the quality factor. The reason being because softening of the material decreases transfer efficiency, but the viscosity of the polymer is not high enough to cause significant damping. From bulk measurements, the Young's modulus is changing from ~1550 MPa to ~250 MPa in the temperature range from ~80° C. to 95° C. BE-SJThEM and BE-AFAM measure Young's modulus drop from ~1750 MPa to 1550 MPa and 1700 MPa, correspondingly. The discrepancy in absolute values is due to the fact that Young's modulus is measured at a frequency of ~250 KHz with BE-SHThEM and BE-AFAM while Young's modulus is measured at a frequency of 200 Hz in the bulk. AFM examination of the sample after mechanical experiments and measurements of the size of the tip imprint provide an estimate for the spatial resolution of these techniques. In the current embodiments of the present disclosure, the radius of imprints varied from 50 to 100 nm.

Segment Mobility

The second model system utilized PET9921 (semi-crystalline PET). In this material there exists a two phase mixture of amorphous and crystalline polymer. As a result of the semi-crystalline nature of PET9921, this polymer has a glass transition at ~85° C. and displays a crystallization exotherm which begins at ~150° C., followed by a sharp melting peak at ~250° C. The mechanical stiffness of the sample starts decreasing at 85° C.

Figure 10A:
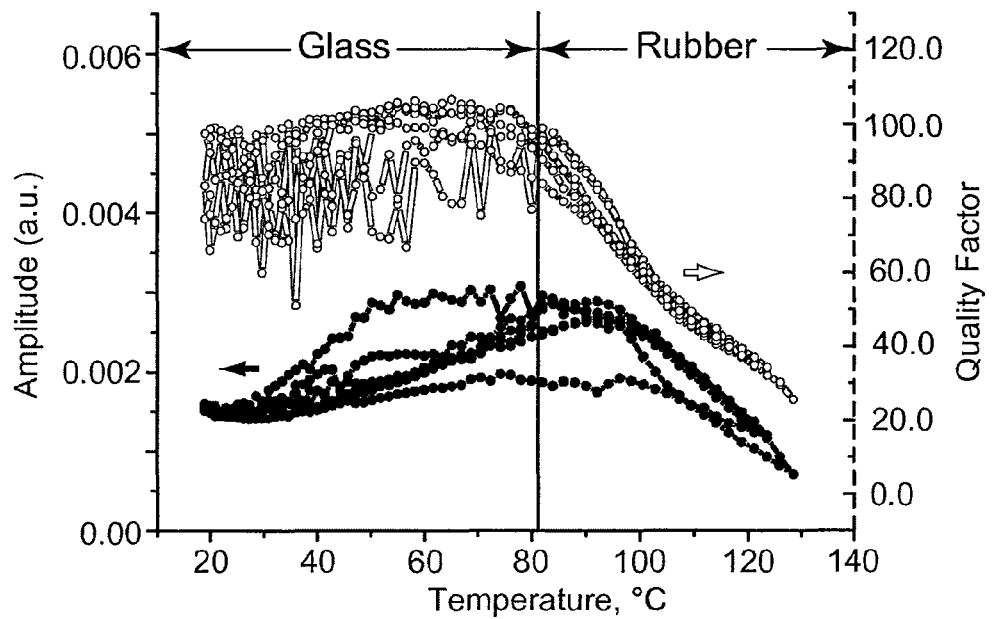
FIG. 10A is a plot of the amplitude and the quality factor of tip oscillations induced by BE-SJThEM on semi-crystalline PET as a function of temperature.
Figure 10B:
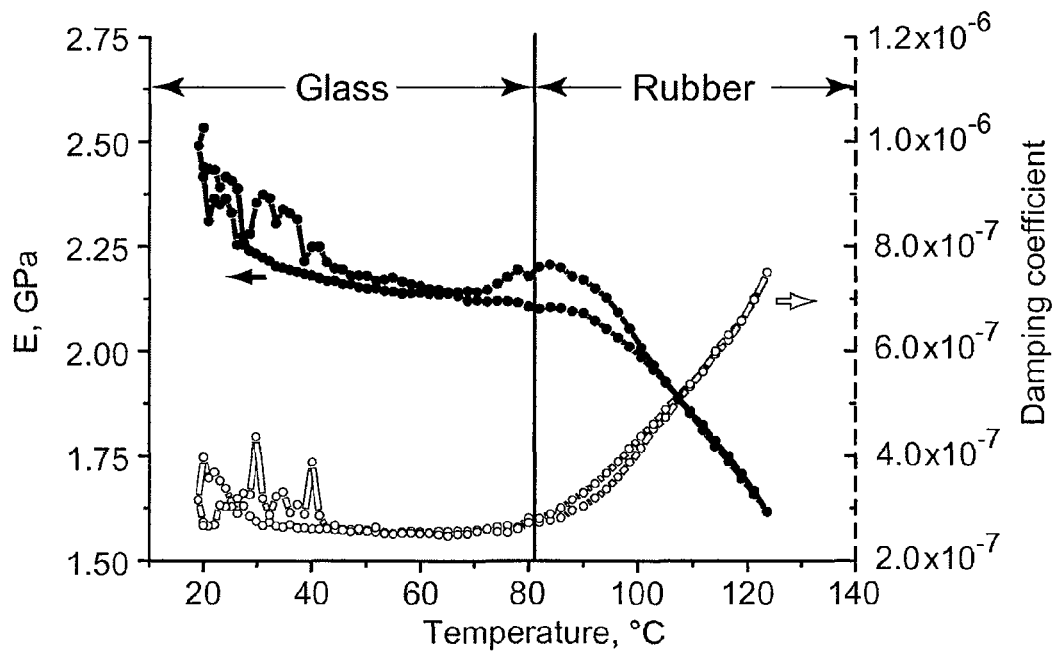
FIG. 10B is a plot of Young's modulus and damping coefficient re-calculated from oscillation parameters obtained by BE-SJThEM on semi-crystalline PET9921 as a function of temperature.
Figure 10C:
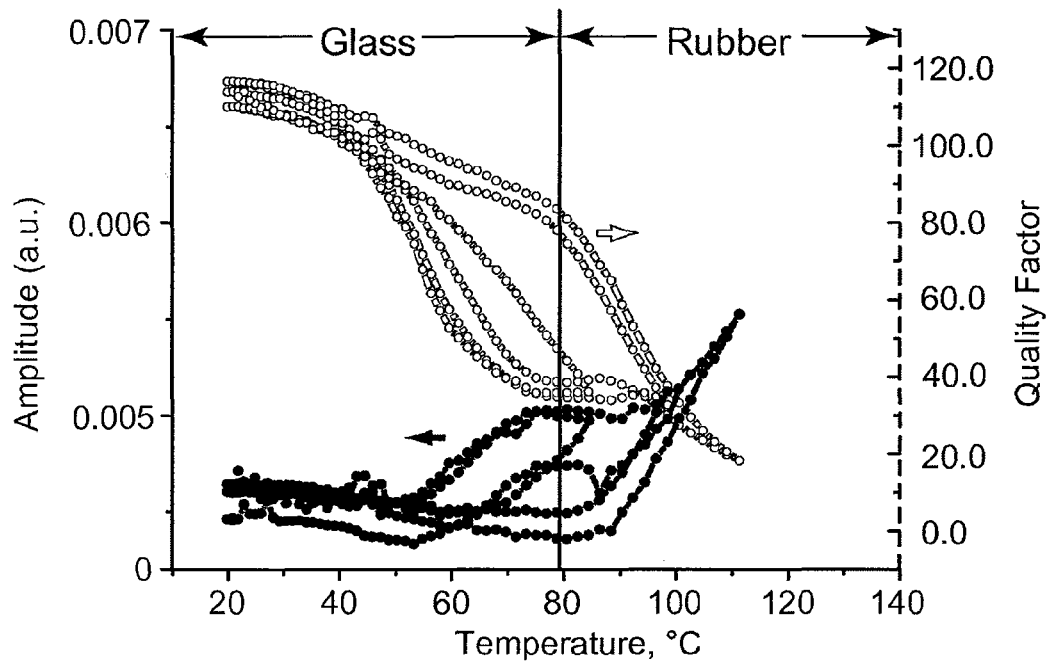
FIG. 10C is a plot of the amplitude and the quality factor of tip oscillations induced by BE-AFAM on semi-crystalline PET as a function of temperature.
Figure 10D:
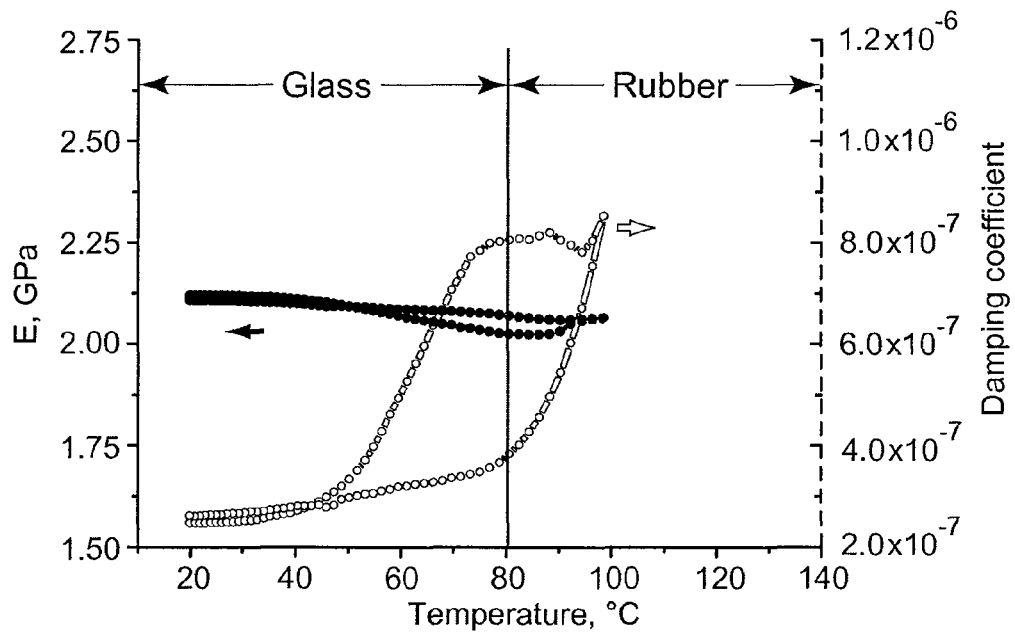
FIG. 10D is a plot of Young's modulus and damping coefficient re-calculated from oscillation parameters obtained by BE-AFAM on semi-crystalline PET9921 as a function of temperature.

FIG. 10A is a plot of the amplitude and the quality factor of tip oscillations induced by BE-SJThEM on semi-crystalline PET as a function of temperature. FIG. 10B is a plot of Young's modulus and damping coefficient re-calculated from oscillation parameters obtained by BE-SJThEM on semi-crystalline PET9921 as a function of temperature. FIG. 10C is a plot of the amplitude and the quality factor of tip oscillations induced by BE-AFAM on semi-crystalline PET as a function of temperature. FIG. 10D is a plot of Young's modulus and damping coefficient re-calculated from oscillation parameters obtained by BE-AFAM on semi-crystalline PET9921 as a function of temperature.

The glass transition temperature of the polymer can be detected from the temperature dependence of the quality factor, Young's modulus, and damping coefficient using BE-SJThEM. The amplitude on a semi-crystalline sample illustrates the same temperature trait as seen in the amorphous sample. However, the semicrystalline PET9921 sample reveals a maximum in amplitude which does not correspond to the glass transition temperature of the polymer. The temperature of the amplitude maximum is a higher than the glass transition temperature detected by bulk DSC, most likely due to the presence of crystalline domains surrounded by an amorphous matrix. This increase in measured Tg is expected due to the highly localized nature of the BE-SJThEM method and the small volume measured. Also the drop in quality factor is noticeable at a temperature around 100° C., which corresponds to the softening temperature of crystalline material.

The behavior is contrasted by the responses measured using the BE-AFAM technique. The quality factor gradually declines upon heating from room temperature to about 50° C. From 50° C. to 70° C., a sharp decline in quality factor is observed. This decline is attributed to the increase of segment mobility before the glass transition temperature is reached. The region of constant Q in the temperature range 70-100° C. can be attributed to the decrease of free volume in polymer near the tip-surface contact area and the re-crystallization. In the bulk measurements these processes were seen as texturing of the polymer under pressure and temperature as well as cold crystallization and polymer hardening. Softening of the polymer, observed during the DMA experiment, results in the further decrease of quality factor for the temperatures above 95° C. During cooling of the polymer from 110° C. to the room temperature, only one characteristic temperature (~85° C.) can be observed. The recrystallization process continues to draw energy from the polymer until it slows down at 85° C., because of the lack of kinetic energy and segment mobility. Thus, the dissipation gets smaller, resulting in an increase of the quality factor. The change of damping coefficient also supports this hypothesis. Thus, one can observe a transient behavior of temperature induced re-crystallization of the polymer using BE-AFAM.

All of the discussion above, regardless of the particular implementation being described, is exemplary in nature, rather than limiting. Although specific components of the system 10 are described, methods, systems, and articles of manufacture consistent with the system may include additional or different components. For example, components of system 10 may be implemented by one or more of: control logic, hardware, a microprocessor, microcontroller, application specific integrated circuit (ASIC), discrete logic, or a combination of circuits and/or logic.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

Further, although selected aspects, features, or components of the implementations are depicted as hardware or software, all or part of the systems and methods consistent with the system 10 may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in a non-transitory computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. An apparatus comprising:
a controller module that generates an excitation signal;
a probe in communication with the controller module, the probe configured to be in contact with a sample at a contact area, the contact area being excited with at least one heating cycle based on the excitation signal; and
a detector that measures a mechanical response of the probe, wherein the mechanical response is a response to the contact area of the sample being excited with the at least one heating cycle based on the excitation signal, and the mechanical response includes a response to local thermal expansion of the sample at the contact area;
wherein the at least one heating cycle utilizes a heating temperature based on a phase transition temperature of the sample.

2. The apparatus of claim 1, wherein the probe is periodically displaced based on excitation signal.

3. The apparatus of claim 2, wherein the excitation signal excites the probe at a frequency within a predetermined frequency band.

4. The apparatus of claim 2, wherein the excitation signal simultaneously excites the probe at a plurality of frequencies within a predetermined frequency band.

5. The apparatus of claim 1 further comprising a mechanical transducer, wherein the mechanical transducer is configured to spatially oscillate the sample and is oscillated based on the excitation signal, the excitation signal characterized by an oscillation amplitude.

6. The apparatus of claim 5, wherein the oscillation amplitude is a zero value.

7. The apparatus of claim 5, wherein the mechanical transducer is oscillated at a frequency within a predetermined frequency band.

8. The apparatus of claim 5, wherein the transducer is simultaneously oscillated at a plurality of frequencies in a predetermined frequency band.

9. The apparatus of claim 1, wherein the contact area is excited with a second heating cycle having a second heating temperature, the second heating temperature being different from the heating temperature of the at least one heating cycle.

10. The apparatus of claim 9, wherein the heating temperature of the at least one heating cycle is higher than the second heating temperature of the second heating cycle.

11. The apparatus of claim 1, wherein the contact area remains substantially the same after being excited with the at least one heating cycle.

12. The apparatus of claim 1, wherein the controller module performs a mathematical function on the measured response and generates a mechanical response of the contact area as a function of temperature.

13. The apparatus of claim 12, wherein the controller module extracts resonances parameters from the measured response.

14. The apparatus of claim 13, wherein the resonance parameters comprise at least one of amplitude, phase, quality factor, or resonance frequency.

15. The apparatus of claim 13, wherein the controller module determines a presence of a phase transition of the sample based on each of the resonance parameters independently.

16. A method comprising:
generating an excitation signal;
positioning a probe in contact with a sample at a contact area, the contact area being excited with at least one heating cycle based on the excitation signal; and
measuring a mechanical response of the probe, wherein the mechanical response is a response to the contact area of the sample being excited with the at least one heating cycle based on the excitation signal, and the mechanical response includes a response to local thermal expansion of the sample at the contact area;
wherein the at least one heating cycle utilizes a heating temperature based on a phase transition temperature of the sample.

17. The method of claim 16, further comprising periodically displacing the probe based on excitation signal.

18. The method of claim 17, wherein the excitation signal excites the probe at a frequency within a predetermined frequency band.

19. The method of claim 17, wherein the excitation signal simultaneously excites the probe at a plurality of frequencies in a predetermined frequency band.

20. The method of claim 16 further comprising oscillating a mechanical transducer based on the excitation signal, the excitation signal characterized by an oscillation amplitude, wherein the mechanical transducer is configured to spatially oscillate the sample.

21. The method of claim 20, wherein the oscillation amplitude is a zero value.

22. The method of claim 20, wherein the transducer is oscillated at frequency within a predetermined frequency band.

23. The method of claim 20, wherein the mechanical transducer is simultaneously oscillated at a plurality of frequencies in a predetermined frequency band.

24. The method of claim 16, wherein the contact area is excited with a second heating cycle having a second heating temperature, the second heating temperature being different from the heating temperature of the at least one heating cycle.

25. The method of claim 24, wherein the heating temperature of the at least one heating cycle is higher than the second heating temperature of the second heating cycle.

26. The method of claim 16, wherein the contact area remains substantially the same after being excited with the at least one heating cycle.

27. The method of claim 16 further comprising performing a mathematical function on the measured response and generating a mechanical response of the contact area as a function of temperature.

28. The method of claim 27, further comprising extracting resonances parameters from the measured response.

29. The method of claim 28, wherein the resonance parameters comprise at least of amplitude, phase, quality factor, or resonance frequency.

30. The method of claim 28, further comprising determining a presence of a phase transition of the sample based on each of the resonance parameters independently.

* * * * *